(12) United States Patent
Shorten

(10) Patent No.: US 12,200,123 B2
(45) Date of Patent: Jan. 14, 2025

(54) SYSTEMS AND COMPUTER-IMPLEMENTED METHODS FOR GENERATING PSEUDO RANDOM NUMBERS

(71) Applicant: Mesinja Pty Ltd, Camberwell (AU)

(72) Inventor: Robert Bede Shorten, Camberwell (AU)

(73) Assignee: MESINJA PTY LTD, Camberwell (AU)

( * ) Notice: Subject to any disclaimer, the term of this patent is extended or adjusted under 35 U.S.C. 154(b) by 0 days.

(21) Appl. No.: 17/791,806

(22) PCT Filed: Jan. 6, 2021

(86) PCT No.: PCT/AU2021/050010
§ 371 (c)(1),
(2) Date: Jul. 8, 2022

(87) PCT Pub. No.: WO2021/138719
PCT Pub. Date: Jul. 15, 2021

(65) Prior Publication Data
US 2024/0097883 A1    Mar. 21, 2024

(30) Foreign Application Priority Data

Jan. 10, 2020   (AU) ................................ 2020900064
Apr. 30, 2020   (AU) ................................ 2020202883

(51) Int. Cl.
*H04L 9/08*        (2006.01)
*G06F 7/58*        (2006.01)
(Continued)

(52) U.S. Cl.
CPC ............ *H04L 9/0894* (2013.01); *G06F 7/582* (2013.01); *G06F 7/586* (2013.01); *G06F 17/11* (2013.01); *H04L 9/0662* (2013.01)

(58) Field of Classification Search
CPC ............................... H04L 9/0662; G06F 7/586
(Continued)

(56) References Cited

U.S. PATENT DOCUMENTS

2003/0059045 A1   3/2003   Ruehle
2003/0144052 A1   7/2003   Walker et al.
(Continued)

FOREIGN PATENT DOCUMENTS

EP   1 548 987 A2   6/2005
EP   1 804 731 A2   10/2007
(Continued)

OTHER PUBLICATIONS

International Search Report for priority application No. PCT/AU2021/050008 dated Mar. 19, 2021, 6p.
(Continued)

*Primary Examiner* — Michael S McNally
(74) *Attorney, Agent, or Firm* — Crowell & Moring LLP

(57) ABSTRACT

Described embodiments relate to systems and method for conditioning, de-biasing and/or whitening raw entropy data or for hashing data. The method comprises receiving data; determining at least a first algebraic number from the data; calculating at least one solution to one or more transcendental equations using the at least the first algebraic number as an input parameter value, wherein the one or more transcendental equations comprise a transcendental function that is capable of generating transcendental number outputs from algebraic number inputs; determining one or more sequences of pseudo random numbers based on the at least one solution; and determining an output based on the one or more sequences of pseudo random numbers. For example, the data may be received from a raw entropy source and (Continued)

comprise raw entropy to be transformed. Alternatively, the data may be data to be hashed and the output may comprise a hash of the data.

26 Claims, 4 Drawing Sheets

(51) Int. Cl.
    *G06F 17/11*           (2006.01)
    *H04L 9/06*            (2006.01)

(58) Field of Classification Search
    USPC .......................................................... 380/46
    See application file for complete search history.

(56) References Cited

U.S. PATENT DOCUMENTS

| | | |
|---|---|---|
| 2003/0182246 A1 | 9/2003 | Johnson et al. |
| 2004/0078576 A1 | 4/2004 | Geitinger |
| 2009/0170584 A1 | 7/2009 | Tan et al. |
| 2009/0313050 A1 | 12/2009 | Payne et al. |
| 2013/0142323 A1 | 6/2013 | Chiarella |
| 2013/0315388 A1 | 11/2013 | Chiarella |
| 2014/0016778 A1* | 1/2014 | Goettfert ............... H04L 9/0668 380/255 |
| 2015/0055778 A1 | 2/2015 | Cox et al. |
| 2016/0380760 A1 | 12/2016 | Campos Canton et al. |
| 2017/0034167 A1 | 2/2017 | Figueira |
| 2017/0264598 A1 | 9/2017 | Cordes |
| 2019/0238329 A1* | 8/2019 | Leara ........................ G06F 7/58 |

FOREIGN PATENT DOCUMENTS

| | | |
|---|---|---|
| EP | 1 840 731 A2 | 10/2007 |
| EP | 3 373 505 A1 | 9/2018 |
| WO | WO 2001/43067 A2 | 6/2001 |
| WO | WO 2006/033898 A2 | 3/2006 |
| WO | WO 2014/027285 A1 | 2/2014 |
| WO | WO 2016/102164 A1 | 6/2016 |

OTHER PUBLICATIONS

Written Opinion of the International Searching Authority for priority application No. PCT/AU2021/050008 dated Mar. 19, 2021, 6p.
International Search Report for application No. PCT/AU2021/050007 dated Mar. 19, 2021, 6p.
Written Opinion of the International Searching Authority for application No. PCT/AU2021/050007 dated Mar. 19, 2021, 6p.
Written Opinion of the International Preliminary Examining Authority for application No. PCT/AU2021/050007 dated Jun. 11, 2021, 7p.
Written Opinion of the International Preliminary Examining Authority for application No. PCT/AU2021/050007 dated Jul. 22, 2021, 8p.
Written Opinion of the International Preliminary Examining Authority for application No. PCT/AU2021/050007 dated Oct. 5, 2021, 8p.
International Search Report for application No. PCT/AU2021/050009 dated Mar. 19, 2021, 6p.
Written Opinion of the International Preliminary Examining Authority for application No. PCT/AU2021/050009 dated Mar. 19, 2021, 5p.
International Search Report for application No. PCT/AU2021/050010 dated Mar. 22, 2021, 5p.
Written Opinion of the International Searching Authority for application No. PCT/AU2021/050010 dated Mar. 22, 2021, 6p.
Examination Report No. 1 for Australian application No. 2020202883 dated Jun. 4, 2020, 7p.
Examination Report No. 2 for Australian application No. 2020202883 dated Sep. 17, 2020, 4p.
Examination Report No. 1 for Australian application No. 2021200062 dated Feb. 24, 2021, 8p.
Examination Report No. 1 for Australian application No. 2021200063 dated Feb. 24, 2021, 4p.
Boriga, R. et al., "A Novel Psuedo-random Bit Generator Based on Some Transcendental Chaotic Systems", *Ovidius University Annals, Economic Scieneces Series, Ovidius University of Constantza, Faculty of Economic Sciences*, pp. 208-212, vol. XI, Issue 1, 2011, Romania.
Feigenbaum, J. J. et al., "Quantitative University for a Class of Nonlinear Transformations", *Journal of Statistical Physics*, Jul. 1978, vol. 19, No. 1, pp. 25-52.
Tu, L. et al., "A Novel Gray Image Encryption Algorithm Based on Modified Transcendental Equation", *Journal of Software(Academy Publishing)*, pp. 2336-2343, vol. 8, No. 9, Sep. 2013, United Kingdom.
"Pseudorandom number generator", Mar. 1, 2016, found on the @ https://web.archive.org/web/20160301034145/https://en.wikipedia.org/wiki/Pseudorandom_number_generator, as per Wayback Machine, 8p.
"Simple random sample", Oct. 24, 2016, found on internet @ http://web.archive.org/web/20161024131124/https://en.wikipedia.org/wiki/Simple_random_sample, as per Wayback Machine, 4p.
"Recurrence relation", Mar. 5, 2011 2016, found on the internet @ https://web.archive.org/web/20110305192204/http://en.wikipedia.org/wiki/Recurrence_relation, as per Wayback Machine, 11p.

\* cited by examiner

SYSTEMS AND COMPUTER-IMPLEMENTED METHODS FOR GENERATING PSEUDO RANDOM NUMBERS

RELATED APPLICATION

This application is a national phase application of International Application No. PCT/AU2021/050010, filed on Jan. 6, 2021, which claim priority to Australian Patent Application No. 2020900064, filed on Jan. 10, 2020 and Australian Patent Application No. 2020202883, filed on Apr. 30, 2020. The entirety of the above applications is hereby incorporated by reference.

TECHNICAL FIELD

Described embodiments relate to systems and computer-implemented methods for generating pseudo random numbers based on solutions to transcendental equations. Some embodiments relate to systems and methods for processing or transforming data using such pseudo random numbers, for example to de-bias and/or condition raw entropy produced by a True (or Hardware) Random Number Generator ("TRNG"), or to generate a hash from input data.

BACKGROUND

Random number generators fall under two broad headings: Pseudo Random Number Generators ("PRNGs"); and TRNGs.

PRNGs generate a sequence of numbers using an algorithm—in most cases they are based on complicated iterated calculations to generate an output that appears "random" due to the complexity of the calculations. The starting point for the PRNG is called the "seed"—the internal structure of the PRNG and the choice of the "seed" can have a significant influence on the statistical properties of the numbers generated by the existing PRNG algorithms. When a PRNG needs a "random" seed, often sources of entropy from the system or external hardware are used to seed the PRNG.

There are many different PRNGs that use iterated algebraic calculations to generate outputs that appear to be "random". An example of a group of PRNGs that rely on a simple iterated calculation are the Linear Congruential Generators ("LCGs")—the fundamental computation in an LCG is as follows:

$$X_{n+1}=(aX_n+b) \bmod m$$

The output sequence of numbers, represented by $X_n$, for n=0, 1, 2, 3, . . . , is based on an internal hidden state from which the $X_n$'s are derived according to the formula shown above. The seed is the first number, $X_0$, in the sequence.

Although there are many distinct LCG algorithms, their outputs tend to exhibit poor statistical behaviour. To help deal with the relatively poor statistical behaviour of individual LCG algorithms, PRNGs based on combinations of different LCGs ("combined LCGs") have been developed.

The total number of unique elements in the sequence generated is always finite—as such, the PRNG will repeat the sequence of numbers it generates at some stage. PRNGs with a large sequence before the PRNG repeats itself have what is known as a large "state". Many of the PRNGs developed in the last thirty to forty years have been designed with a large state coupled with statistical properties that make the output appear to be "random".

Another example of a different class of PRNGs is chaotic PRNGs which generate random numbers through the use of an iterated calculation that exhibits the hallmarks of mathematical chaos, i.e., where the stream of numbers produced by the PRNG exhibit the following broad properties:
  Sensitive dependence on the initial starting point;
  Rapid onset of apparently random unstable behaviour where one or more parameters in the iterated calculation reach certain "critical" values; and
  Where the instabilities (in terms of the numbers generated) display apparent aperiodic and unpredictable behaviour (or nearly so) for all practical purposes.

There also exist PRNGs that are mixed combinations of two or more unrelated PRNGs where the outputs are combined in an effort to improve the statistical performance of the aggregated output.

Due to computational needs, memory requirements, security needs, and the desired statistical quality of the random numbers generated, there are many different PRNG algorithms. No one algorithm tends to be suitable for all situations; for example, some PRNGs which are suitable for computer simulations may not be suitable for cryptographic applications.

As noted above, no algorithm on a computer or device can ever be a true random number generator since the limited capacity of the computer or device to carry digits means it is inevitable that the algorithm will eventually return to its starting point and repeat itself.

To deal with this, TRNG's have been developed that utilise an underlying physical or quantum process as a source of randomness. Every physical or quantum source is generally checked to see whether or not there is some bias or other regularity that might undermine its usefulness as a randomness source. This is usually addressed by further software based processing to reduce or eliminate these biases and/or other regularities. Furthermore, there are very many settings where the availability of a suitably reliable source of entropy may be lacking or only operate intermittently and, as such, impose a performance constraint that can limit the utility of the external randomness source.

A hash function is an algorithm used to map (i.e., transform) data of an arbitrary size to a fixed size value (i.e., the hash) that possesses one or more of the following characteristics: (i) deterministic; (ii) uniformity of the outputs; (iii) collision resistance; (iv) excellent diffusion/avalanche properties; (v) irreversibility; and/or (vi) unpredictable outputs. PRNGs that share these characteristics are potential candidates for use as a hash function.

It is desired to address or ameliorate one or more shortcomings or disadvantages associated with prior methods and systems for random number generation, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a computer implemented method of generating a pseudo random numbers, the method comprising: a) determining at least one algebraic input parameter value for a transcendental equation, wherein the transcendental equation comprises a transcendental function that is capable of generating transcendental number outputs from algebraic number inputs; b) calculating a solution to the transcendental equation based on the at least one algebraic input parameter value; and c) generating the pseudo random numbers based on the solution. For example, the transcendental function within the transcendental equation is a transcendental function of a variable being solved for. For example, the pseudo random numbers may be decimal numbers, binary numbers or numbers that are neither decimal numbers nor binary numbers.

Some embodiments relate to a computer implemented method comprising: receiving data from a raw entropy source, the data comprising raw entropy to be transformed; determining at least a first algebraic number from the data; calculating at least one solution to one or more transcendental equations using the at least the first algebraic number as an input parameter value, wherein the one or more transcendental equations comprise a transcendental function that is capable of generating transcendental number outputs from algebraic number inputs; determining one or more sequences of pseudo random numbers based on the at least one solution; determining an output based on the one or more sequences of pseudo random numbers. The raw entropy source may be an external raw entropy source. The output may comprise a whitened transformation of the data, or conditioned and de-biased data. The method may be performed by a device comprising a True Random Number Generator (TRNG).

In some embodiments, the method may further comprise: determining an interruption of the raw entropy output from the raw entropy source; and responsive to determining the interruption, providing at least a portion of the one or more sequences of random numbers as an input parameter value for the one or more transcendental equations. The method may further comprise: responsive to determining that the interruption has been rectified, determining the determining at least first algebraic number from the data received from the raw entropy source.

Some embodiments relate to a computer implemented method comprising: receiving data to be hashed; determining at least a first algebraic number from the data; calculating at least one solution to one or more transcendental equations using the at least the first algebraic number as an input parameter value, wherein the one or more transcendental equations comprise a transcendental function that is capable of generating transcendental number outputs from algebraic number inputs; determining one or more sequences of pseudo random numbers based on the at least one solution; and determining an output based on the one or more sequences of pseudo random numbers, wherein the output comprises a hash of the data.

The method may further comprise converting the determined output into hexadecimal text for use as the hash; and outputting the hexadecimal text.

In some embodiments, generating one or more sequences of pseudo random numbers comprises generating one or more sequences of decimal numbers, binary numbers and numbers that are neither decimal numbers nor binary numbers. The method may further comprise converting the one or more sequences of numbers into one or more sequences of integers; and wherein determining an output based on the one or more sequences of pseudo random numbers comprises determining an output bit string based on the one or more sequences of integers. In some embodiments, determining at least a first algebraic number from the data comprises converting the data to be processed into at least a first number.

In some embodiments, the data to be processed comprises a bit string and the method further comprising: converting the bit string into a corresponding string of integers; and converting the corresponding string of integers into the at least first number.

The method may be performed iteratively to generating pluralities of pseudo random numbers. In some embodiments, generating the one or more sequences of pseudo random numbers may comprise: performing multiple iterations of the calculating of at least one solution to the one or more transcendental equations, wherein input parameter values for a next iteration are derived from solutions to a current iteration.

The one or more sequences of pseudo random numbers may comprise a first sequence of numbers and determining the output based on the one or more sequences of numbers may comprise: deriving the output as a subset of numbers of the first sequence of numbers generated. The first sequence of numbers may be a first sequence of decimals or binary numbers or numbers that are neither decimal numbers nor binary numbers and the subset of numbers may comprise a subset of decimals or binary numbers or numbers that are neither decimal numbers nor binary numbers. In some embodiments, the one or more sequences of pseudo random numbers may comprise a first sequence of numbers and a second sequence of numbers and determining the output based on the one or more sequences of numbers may comprise: deriving the output from a first subset of numbers selected from the first sequence of numbers and a second subset of numbers selected from the second sequence of numbers.

In some embodiments, generating the first sequence may comprise assigning a first number selected from the first sequence as a first input parameter value for the one or more transcendental equations and assigning a second number selected from the from the second sequence as a second input parameter value for the one or more transcendental equations; and generating the second sequence may comprise assigning the second number as the first input parameter value for the one or more transcendental equations and assigning the first number as the second input parameter value for the one or more transcendental equations.

The at least one first algebraic number, when provided as an input to the transcendental function, may cause the transcendental function to output a transcendental number. The transcendental function may be associated with an exceptional set, and wherein the transcendental function will produce a transcendental number for all algebraic input values that do not belong to the exceptional set, and an algebraic number for all algebraic input parameter values that do belong to the exceptional set. The exceptional set may be (i) a countable finite set of algebraic values or (ii) a countably infinite set of algebraic values which is only a negligible sub-set of the algebraic numbers.

In some embodiments, the transcendental equation is:

$$e^{-\beta\lambda^2} = -\alpha\lambda \mathrm{Erfc}(\lambda)$$

$$\text{where } \mathrm{Erfc}(\lambda) = 1 - (2/\sqrt{\pi})\sum_{n=0}^{\infty}\left[(-1)^n \lambda^{2n+1}\right]/[(2n+1)(n!)]$$

-continued where $e^{-\beta\lambda^2} = \sum_{n=0}^{\infty}(-\beta\lambda^2)^n/n!$ where $\lambda$ is the solution;
$\alpha$ is a first of the at least one algebraic input parameter value and $\beta$ is a second of the at least one algebraic input parameter value; and
wherein $\alpha$ and $\beta$ are real algebraic numbers.

In some embodiments, the transcendental equation is: $e^{\beta_0}\alpha_1^{\beta_1} \ldots \alpha_n^{\beta_n}=\exp(\lambda)$ with the following analytic solution:

$\beta_0+\beta_1\cdot\ln(\alpha_1) \ldots \beta_n\cdot\ln(\alpha_n)=\lambda$ where $\lambda$ is the transcendental number, $\beta_0$ is a non-zero algebraic number, $\beta_1 \ldots \beta_n$ are algebraic numbers, $\alpha_1 \ldots \alpha_n$ are non-zero algebraic numbers, and n is an integer and is $\geq 1$; and
wherein the at least one algebraic input parameter value comprises $\beta_0, \beta_1 \ldots \beta_n$, and $\alpha_1 \ldots \alpha_n$.

In some embodiments, the transcendental equation is: $e^{\beta_0}\alpha_1^{\beta_1}=\exp(\lambda)$ with the following analytic solution:

$\beta_0+\beta_1\cdot\ln(\alpha_1)=\lambda$ where $\lambda$ is the solution, $\beta_0$ is a non-zero algebraic number, $\beta_1$ is an algebraic number and $\alpha_1$ is a non-zero algebraic number; and
wherein the at least one algebraic input parameter value comprises $\beta_0, \beta_1$ and $\alpha_1$.

In some embodiments, determining one or more sequences of pseudo random numbers based on the at least one solution comprises generating a string of pseudo random numbers. For example, the string of pseudo random numbers may comprise a binary string of pseudo random numbers. In some embodiments, the method may comprise: converting the at least one solution into a pseudo random decimal value between 0 and 1; and converting the decimal value into the binary string of pseudo random numbers. The method may comprise assigning one of a zero or a one to each even digit of the decimal value and assigning the other of a zero or a one to each odd digit of the decimal value. The method may comprise determining which one of a zero or a one to assign to each even digit and each odd digit of the decimal value by determining whether (i) the decimal value, or, alternatively, (ii) a decimal generated in a prior iteration, is greater than 0.5. In some embodiments, converting the decimal value into the binary string of pseudo random numbers comprises replacing each digit of the decimal value with the last bit of the equivalent ASCII character. In some embodiments, generating the binary string of pseudo random numbers comprises: determining an integer from the decimal value by removing the leading zero and the decimal point; determining an equivalent binary value of the integer value; and determining the binary string of pseudo random numbers as being the determined equivalent binary value where leading zeroes are retained.

In some embodiments, the method comprises: determining that a length of the pseudo random numbers or string of pseudo random numbers or string of the pseudo random numbers is less than a threshold length; performing the steps of calculating and determining to generate a further string of pseudo random numbers; and combining the string of pseudo random numbers and the further string of pseudo random numbers to create a combined binary string of pseudo random numbers. For example, the string may be a binary string.

Some embodiments relate to a non-transitory machine-readable medium storing instructions which, when executed by one or more processors, cause an electronic apparatus to perform any one of the described methods.

Some embodiments relate to system comprising: one or more processors; and memory comprising a non-transitory machine-readable which, when executed by the one or more processors, causes the system to perform any one of the described methods.

Some embodiments relate to a True Random Number Generator (TRNG) comprising: the system of any one of the described embodiments; and a raw entropy data source configured to provide raw entropy data to the system.

Some embodiments relate to a hashing system, comprising: the system of any one of the described embodiments; and a data source configured to provide data to be hashed to the system.

BRIEF DESCRIPTION OF DRAWINGS

Embodiments of the present disclosure will now be described by way of non-limiting example only with reference to the accompanying drawings, in which.

DESCRIPTION OF EMBODIMENTS

Figure 1:
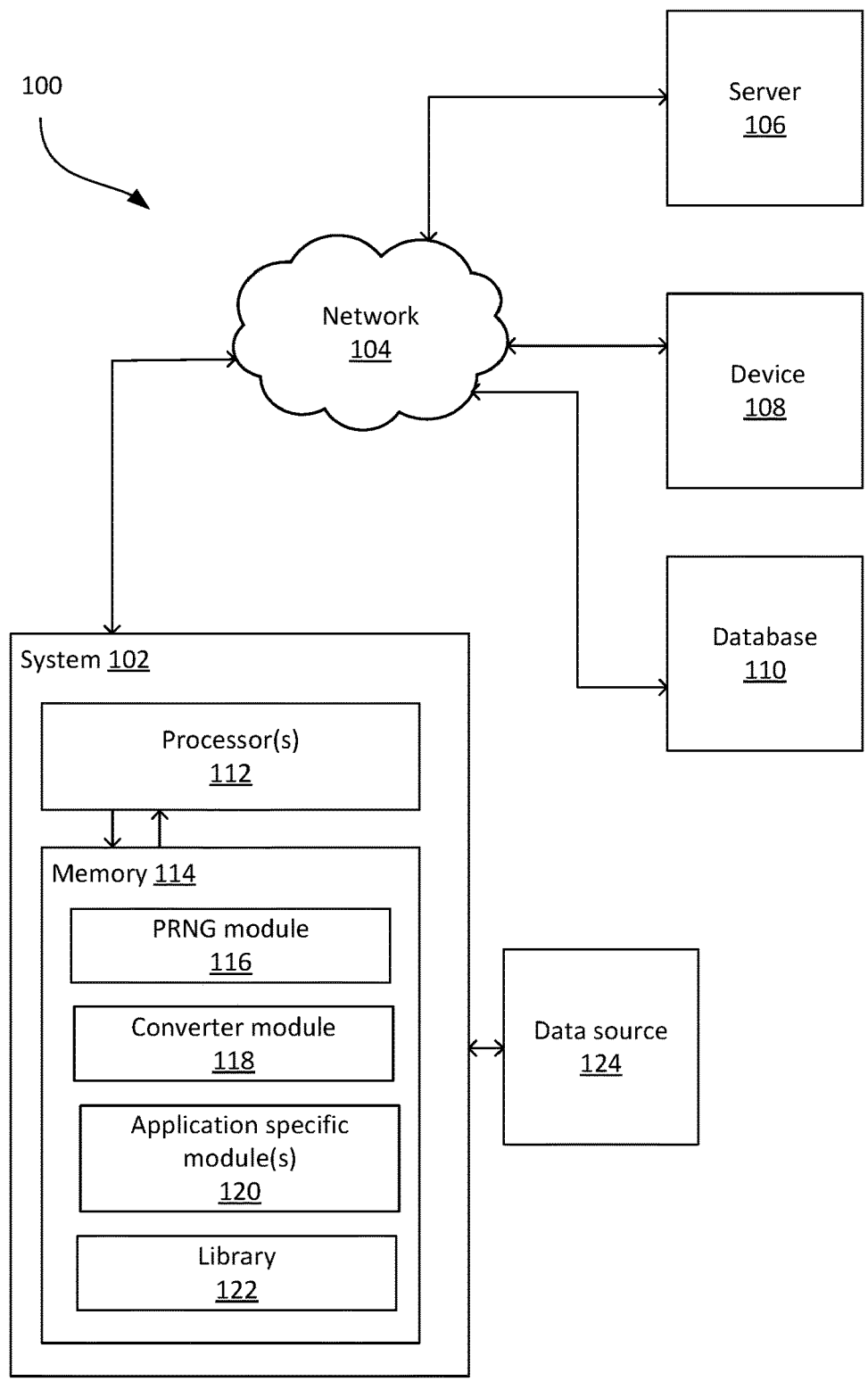
FIG. 1 is a block diagram of a communications system including system configured to generate pseudo random numbers, according to some embodiments.

Described embodiments relate to systems and computer-implemented methods for generating pseudo random numbers based on solutions to transcendental equations. Some embodiments relate to systems and methods for processing or transforming data using such pseudo random numbers, for example to de-bias and/or condition raw entropy produced by a TRNG, or to generate a hash.

Embodiments generally relate to systems and computer-implemented methods for generating pseudo random numbers. Some embodiments relate to systems and methods for generating pseudo random numbers based on solutions to transcendental equations which are involving one or more transcendental functions of the variable being solved for. For example, the pseudo random numbers may be decimal numbers, binary numbers or numbers that are neither decimal numbers nor binary numbers. Some embodiments relate to systems and methods for generating sequences of pseudo random decimals between 0 and 1 based on solutions to transcendental equations.

A transcendental number is a number that is not algebraic, i.e., a transcendental number is a number that not a solution of a non-zero polynomial equation with integer coefficients. The adjective "transcendental" is a reference to the number "transcending" algebra. This implies that every transcendental number is irrational (i.e., cannot be represented as the ratio of two integers). Since all irrational numbers have decimal expansions that neither terminate nor become periodic, all transcendental numbers share this property as well.

Similarly, a transcendental function is an analytic function that cannot be expressed as finite sequence of algebraic operations.

The described systems and methods are based on a special subset of transcendental functions that have the known property of generating transcendental number outputs from algebraic number inputs in all but a defined number of cases where algebraic outputs emerge. The concepts of: (i) the "exceptional set" of a transcendental function; and (ii) a "countable set" are relevant to the systems and computer-implemented methods for generating pseudo random numbers described herein. These concepts define which transcendental functions are used in the systems and computer-implemented methods for generating pseudo random numbers described herein.

The definition of the exceptional set of a transcendental function is set out in the introduction to the following paper: D. Marques, F. M. S. Lima, "Some Transcendental Functions with an Empty Exceptional Set", submitted on 10 Apr. 2010 (v1), last revised 25 Aug. 2012 (v2), arXiv: 1004.1668v2 [math.NT] as follows:

"Functions that can be constructed using only a finite number of elementary operations are examples of algebraic functions. A function which is not algebraic is, by definition, a transcendental function—e.g., basic trigonometric functions, exponential function, their inverses, etc. If $f$ is an entire function, namely a function which is analytic in C, to say that $f$ is a transcendental function amounts to say that it is not a polynomial. By evaluating a transcendental function at an algebraic point of its domain, one usually finds a transcendental number, but exceptions can take place. For a given transcendental function, the set of all exceptions (i.e., all algebraic numbers of the function domain whose image is an algebraic value) form the so-called exceptional set . . . "

A "countable set" means a set with the same cardinality (i.e., number of elements) as some subset of the set of natural numbers. A countable set is either a finite set or a countably infinite set. For example, the facts that: (i) all algebraic real numbers form a countably infinite set; and (ii) all real numbers form an uncountably infinite set were proven by the German mathematician Georg Cantor in 1874. By implication, all real transcendental numbers necessarily form an uncountably infinite set since, by definition, the real numbers are the union of algebraic and transcendental numbers. As a corollary to the preceding points, "almost all" real numbers are transcendental numbers. The term "almost all" here has a precise mathematical meaning—it means all other than a negligible subset (in the sense that the set of exceptions has Lebesgue measure zero).

A transcendental function which has an exceptional set whose elements comprise a countable set that does not include all algebraic numbers is hereafter referred to as a "Countable Exceptional Set Transcendental Function".

In some embodiments, the described systems and methods are based on Countable Exceptional Set Transcendental Functions. In some embodiments of the systems and computer-implemented methods for generating pseudo random numbers described herein, the Countable Exceptional Set Transcendental Function will have an exceptional set that is countably finite (which is taken to include the case where the exceptional set is empty) or is countably infinite but which is only a negligible sub-set of the algebraic numbers (in the sense that the set of exceptions has Lebesgue measure zero).

For example, the exponential function, $e^x$, is a transcendental function whose exceptional set is countably finite in that it has only one algebraic number in its exceptional set, namely, x=0. The function $a^b$ is a transcendental function whose exceptional set is countably infinite and is only a negligible sub-set of the algebraic numbers. According to the Gelfond-Schneider theorem, where a is an algebraic number (not equal to either 0 or 1) and b is an irrational algebraic number, the function yields a transcendental number, and where a is an algebraic number and b is a rational algebraic number, the function yields an algebraic number.

As a practical matter, the choice of particular Countable Exceptional Set Transcendental Function for a given application is informed, partly at least, by a consideration of the size of its exceptional set. Where the exceptional set of the particular Countable Exceptional Set Transcendental Function is: (i) countably finite; or (ii) countably infinite but nonetheless a negligible sub-set of the algebraic numbers; or (iii) countably infinite but neither the exceptional set nor the non-exceptional set is a negligible sub-set of the algebraic numbers, the corresponding transcendental equation can be structured so that the likelihood of an input to the function being selected as one of the exceptional set is remote, and even if it did occur, it would have negligible impact on the performance of the PRNG.

Transcendental functions with the property of "algebraic numbers in/transcendental numbers out" (with a countable set of exceptions) are characteristic of Countable Exceptional Set Transcendental Functions. The importance of such transcendental functions in computer/software applications arises because a computer/device used to generate the outputs can only hold a finite number of digits in its inputs and, as such, the inputs are always algebraic numbers.

The described systems and methods may generate pseudo random numbers based on approximations to transcendental numbers. Specifically, in some embodiments, the described systems and methods generate a sequence of numbers whose leading digits correspond to the leading digits of a transcendental number. The approximate nature of these results arises from: (i) the specific computational methods used; (ii) the limitations of the computing equipment/device on which they are generated (primarily limitations on the number of digits that are stored on the computing equipment/device); and (iii) limitations in the accuracy of the mathematical functions used in the software language in which the described method is coded.

The approximate transcendental numbers results may be converted or processed into a sequence of decimals between 0 and 1, and then, in some embodiments, into a bit stream. The generated transcendental numbers may be used for a variety of applications as discussed in further detail below.

In some embodiments, the digits generated by the described systems and methods on the computer/device may match the corresponding digits of the transcendental number to the full extent of the floating point numbers held in the memory of the computer/device; however, even where this situation exists, the resulting number is an approximation of the actual transcendental number due to the factors listed immediately above under points (ii) and (iii).

It is noted that "almost all", for example, of the decimals and bits generated represent samples from a sequence of "normal numbers". That is, when an infinitely long string of digits is considered, for example, the relative frequency of each digit from 0 to 9 is the same and that for the corresponding bit stream derived from the decimals, the relative frequency of 0 and 1 is the same. The mathematical basis for the conclusion that that "almost all" of the decimals and bits generated represent samples from a sequence of "normal numbers" even though they represent approximations of a transcendental number is set out in the theorem by the French mathematician Emile Borel in 1909 that "almost all" real numbers are normal numbers. As a corollary to this, "almost all" real numbers are, in fact, normal in every base (these are known as "absolutely normal" numbers). As before, the term "almost all" here has a precise mathematical meaning—it means all other than a negligible subset (in the sense that the set of exceptions has Lebesgue measure zero).

Normal numbers, as explained below, have a property of equidistribution of digits and, since the digits in each, for example, distinct decimal number generated by the described methods and systems in almost all instances represents a sample of the leading digits from a distinct normal number, the sequence of decimal numbers is statistically indistinguishable from an unbiased random sequence of distinct decimals between 0 and 1 when a large number of distinct decimals is considered even though each decimal generated has a finite number of digits within it. The sequences of decimals can be easily converted to a corresponding stream of 0's and 1's while retaining the normality property.

The only limitation on the statistical behaviour of the bit stream is the risk of a collision (i.e., a repeated sequence) due to the computing equipment/device having a finite memory and carrying a finite number of floating digits.

Transcendental equations involve one or more transcendental functions of the variable being solved for and it is often the case that they cannot often be solved using algebraic operations. In other words, a transcendental equation is an equation containing a transcendental function of the variable(s) being solved for. For example, transcendental equations where the variable to be solved for appears only once, as an argument to the transcendental function, can be solved, with inverse functions and/or be evaluated directly; however, where the transcendental equation is more complex, such as where the variable appears both as an argument to a transcendental function and elsewhere in the equation it is usually not solvable using algebraic operations or have trivial solutions. In these cases, the solution may be found using "root finding" algorithms.

In some embodiments, the transcendental equation comprises at least one Countable Exceptional Set Transcendental Function and, separately, a non-linear function of the variable being solved for with any number of given algebraic parameters where a root finding algorithm or similar method must be employed. The inclusion of the non-linear function of the variable being solved for in such circumstances is a design feature to avoid those cases where an algebraic input to the Countable Exceptional Set Transcendental Function generates an algebraic number and, as a result, provide further obfuscation. This is achieved by choosing a suitable non-linear function of the variable being solved for such that no member of the exceptional set of the Countable Exceptional Set Transcendental Function is a solution of the transcendental equation. By way of example, the $\mathrm{Erfc}(\lambda)$ component of the transcendental equation in eqn 1 below performs this role.

In some embodiments, the described systems and methods generate an approximation to a transcendental number by directly solving a transcendental equation comprised of at least one Countable Exceptional Set Transcendental Function for any number of given algebraic parameters and inputs.

In some embodiments, the solution to a transcendental equation comprises a non-vanishing linear combination of a finite number of logarithms of non-zero algebraic numbers with algebraic coefficients where the constant term is not equal to zero where this combination, when evaluated, will always produce a transcendental number. This evaluated number is taken to be the solution for the purposes of the systems and computer-implemented methods for generating pseudo random numbers.

In some embodiments, the described systems and methods generate an approximation to a transcendental number based on a combination of one or more transcendental equations and/or functions comprising one or more Countable Exceptional Set Transcendental Functions for any number of given algebraic parameters and inputs.

Unlike some known techniques for producing pseudo random numbers, the statistical behaviour of the output produced by the described methods and systems does not rely on a complicated series of iterated algebraic calculations to generate the stream of pseudo random numbers.

Extensive statistical testing of the described methods and systems using the PractRand battery of statistical tests has confirmed that the bit streams generated do have the expected statistical properties of normality implied by mathematical theory. For example, two separate tests each comprising 256 terabytes of binary data in June and August 2020 passed PractRand.

System Architecture

Referring now to FIG. 1, there is shown a block diagram of a system 102 configured to generate pseudo random numbers, according to some embodiments. In some embodiment, as illustrated, the system 100 is deployed in a communications system 100 and is configured to communicate with one or more remote devices, servers and/or databases over a communications network 104. For example, the system 102 may communicate with one or more of server 106, device 108 and database 110. Examples of a suitable communications network 104 include cloud server network, wired or wireless internet connection, Bluetooth™ or other near field radio communication, and physical media such as USB. The system 102 comprises one or more processor(s) 112 and memory 114.

Processor(s) 112 is configured to execute instructions stored in memory 114 to cause the PRNG system 102 to generate pseudo random numbers, according to the described methods. Processor 112 may comprise one or more microprocessors, central processing units (CPUs), application specific instruction set processors (ASIPs) or other processors capable of reading and executing instruction code.

Memory 114 may comprise one or more volatile or non-volatile memory types, such as RAM, ROM, EEPROM, or flash, for example. Memory 114 may be configured to store executable code modules for execution by processor 112. For example, memory 114 may comprise one or more programs or modules comprising computer executable code, which when executed by the one or more processors 112 causes the PRNG system 102 to perform certain functionality. For example, as illustrated, memory 114 comprises a PRNG module 116, which is configured to determine a solution to a transcendental equation based on one or more algebraic input values, wherein the transcendental equation comprises a transcendental function that is configured to or capable of generating transcendental number outputs from algebraic number inputs. For example, the transcendental function may be associated with an exceptional set, wherein the transcendental function will produce a transcendental number for all input values that do not belong to the exceptional set, and an algebraic number for all input parameter values that do belong to the exceptional set. The exceptional set comprises a countable exceptional set, which may be finite (i.e., zero or a fixed number) or infinite but where the exceptional set still forms a negligible sub-set of all algebraic numbers (in the same sense as having a Lebesgue measure of zero).

Memory 114 may comprise a converter module 118 configured to convert numbers generated by the PRNG module 116 into strings of pseudo random numbers. The converter module 118 may be configured to convert a number generated by the PRNG module 116 into a decimal value between zero and one. In some embodiments, the converter module 118 may also be configured to convert the decimal value into a binary string of pseudo random numbers. For example, the converter module 118 may assign one of a zero or a one to each even digit of the decimal value and assign the other of a zero or a one to each odd digit of the decimal value. In some embodiments, the converter module 118 may determine which of a one or zero to assign to even digits and odd digits by determining whether or not (i) the decimal value or, alternatively, (ii) a decimal generated in a prior iteration is greater than 0.5. For example, if the decimal or the decimal generated in a prior iteration (e.g. the most recent iteration), is greater than 0.5, the converter module 118 may assign a one to even digits and a zero to odd digits, or vice versa. The converter module 118 may be configured to convert a number generated by the PRNG module 116 into a number of any base, including bits (base 2), decimals (base 10), or numbers that are neither decimal numbers nor binary numbers (bases other than 2 or 10).

In some embodiments, the converter module 118 may convert the decimal value into a binary string of pseudo random numbers by replacing each digit of the decimal value with the last bit of its equivalent ASCII character.

Alternatively, the converter module 118 may convert the number into the binary string by: (i) conversion of the number into an integer based on the digits following the decimal point; (ii) determining an equivalent binary value of the integer; and (iii) determining the binary string of pseudo random bits as being the determined equivalent binary value of the integer. For example, this may involve restating the string of decimal digits as an n digit integer and then converting this integer into its equivalent binary value where leading zeroes are retained.

Memory 114 may further comprise one or more application specific modules 120 configured to process outputs from the PRNG module 116 and/or the converter module 118 to perform some process for a specific application, such as encryption applications, as will be discussed in more detail below. However, it will be appreciated that in some embodiments, the application specific module(s) 120 may be deployed on some remote or external server or device, such as server 106 and/or device 108, which may be configured to communicate with the system 102 to receive the pseudo random numbers.

The system 102 may be coupled to or in communication with a data source 124 configured to provide data to the system 102, and for example, the application specific module(s) 120, for processing. In some embodiments, the data source 124 may be a raw entropy data source. The data source 124 may be a hardware device configured to provide raw entropy. The data source 124 may be configured to cooperate with the application specific module(s) 120 and the PRNG module 116, and in some embodiments, the converter module 118, to provide a TRNG with conditioned and de-biased outputs. In some embodiments, the data source 124 may be an interface configured to receive or determine data such as sensitive data from a user or device. For example, such sensitive data may comprise passwords, passcodes, usernames, files, etc.

As discussed in more detail below, the PRNG module 116 generates numbers (i.e., decimal numbers, binary numbers or numbers that are neither decimal numbers nor binary numbers) that are uniformly distributed and are statistically high quality coupled with a high level of resistance to the birthday problem collisions. This makes them suitable for a variety of applications. Examples of suitable applications include:

Key and seed generation for data security and encryption applications (for example, the generation of high quality seeds on devices and virtual machines lacking access to suitably random seeds or having a low level of available entropy available from which suitably random seeds could be constructed);

Hashing (i.e., as hashing function for authentication, certification, and pseudonymisation);

Securing data at rest and in motion (i.e., as an encryption protocol in its own right such as a stream cipher or for use in conjunction with other existing CSPRNGs (a Cryptographically Secure PRNG) and PRNGs and data transmission/communications protocols);

De-biasing and conditioning of raw entropy output from a TRNG;

Generation of identifiers for use in IT systems for devices, equipment and locations (e.g., MAC number generation and randomisation);

Generation of random numbers for use in modelling (such as for use in Monte Carlo analysis and similar methods) in physics, engineering, artificial intelligence/machine learning, computational biology, mathematics, social sciences and financial markets/commerce. Examples include the generation of random numbers for use in modelling of fluid flows, numerical weather forecasting, economics phenomena, artificial intelligence for games, and the evaluation of derivatives and credit portfolio risk and return in financial markets); and Electronic gaming and lottery applications (e.g., electronic gaming machines, online gaming applications and lottery machines).

Memory 114 may also include a database or library 122 for storing data, such as values for use as input parameters for generating numbers using the derived from data received from one or more of the server 106, device 108 and/or database 110. For example, the stored input parameter values may be derived from data received from a random noise source. In some embodiments, stored input parameter values may be derived from pseudo random numbers previously generated by the PRNG system 102. Suitable values for input parameters for the PRNG module 116 may be determined based on specific requirements for end applications of the pseudo random number string and/or on the characteristics of the particular Countable Exceptional Set Transcendental Function or functions used in system 102, for example, and as will be discussed in more detail below.

In some embodiments, underlying physical processes are used as a source of randomness as values for input parameters for the PRNG module 116. For example, one or more input parameter values may be derived from data based on nuclear decay detection, quantum mechanical noise source in electronic circuits; photon streams through a partially silvered mirror; operator based sources such as timing between key strokes, etc.; atmospheric noise; and thermal noise in electronics. In some embodiments, one or more input parameter values may be derived from the physical behaviour of a device or network. Examples include clock drift, mouse and keyboard input, network traffic, add-on hardware devices, or images gathered from changing subject matter can also be used as input values. In such embodiments, the values may be converted into or stored as numbers (e.g., as decimal numbers, binary numbers, or numbers that are neither decimal numbers nor binary numbers) in library 122 for use in the parameters used to calculate the approximate solutions to transcendental equations by PRNG module 116.

Generating Transcendental Numbers

As mentioned above, the PRNG module 116 is configured to or capable of generating approximate transcendental numbers as solutions to transcendental equations based on at least one Countable Exceptional Set Transcendental Function for the given algebraic input parameter value(s).

In those instances where the transcendental equation cannot be evaluated directly using algebraic operations in this setting, as mentioned above, the solution is generated using some form of root finding algorithm.

In some embodiments, the transcendental equation may be represented by following:

$$e^{-\beta\lambda^2} = -\alpha\lambda Erfc(\lambda) \qquad \text{(eqn 1)}$$

where e is an exponential function, $$e^x = \sum_{n=0}^{\infty} x^n/n!,$$

is the Countable Exceptional Set Transcendental Function, and $Erfc()$ is a complementary error function and is defined as follows:

$$Erfc(x) = 1 - (2/\sqrt{\pi})\sum_{n=0}^{\infty}[(-1)^n x^{2n+1}]/[(2n+1)(n!)]$$

$\alpha$ and $\beta$ are parameters having values that are real algebraic numbers>0;

and $\lambda$ is the transcendental number that will solve the equation.

As mentioned above, there are several "root finding" algorithms that can be used to solve this and other transcendental equations from a given starting point, k, (as discussed in more detail below).

In the above embodiments, as the exponential function appears on the left hand side of each transcendental equation, it can be said that for any given value of the right hand side held in the computer's memory, it may always be represented by a finite number of digits and, as such, this number may always be an algebraic number (because a finite number of digits (i.e., digits of decimal numbers, binary numbers or numbers that are neither decimal numbers nor binary numbers) is always a rational number and all rational numbers are algebraic numbers).

As x=0 (which is the only value of x for which $e^x$ is algebraic) is never a solution to the transcendental equation listed above and since the exponential function used in the transcendental equation is always being set equal to an algebraic number in the computer, it is necessarily the case that the exponent (i.e., the "x") is a transcendental number and, because the $\alpha$, $\beta$ and start point parameters are themselves algebraic (again due to the limited number of digits), the solution to eqn 1 has a transcendental number as its solution.

The exponential function in most software languages is represented by a finite number of terms taken from the series expression for the exponential function shown above. As such, it is inevitable that the solution to the transcendental equation for a given $\alpha$ and $\beta$ parameter value in the example of eqn 1 will be an approximation only and that the approximation is limited not only by the start point and the number of iterations (if a numerical method is adopted for solving the transcendental equation) or the number of terms used (if an analytic approximation method is used for solving the transcendental equation) or where an analytic approximation is used iteratively but also by the limited number of terms in the software expression for the exponential function itself. Despite these limitations, the leading digits in the solution will mirror the actual solution to the extent these limitations collectively permit.

The following considerations may inform limits placed on $\alpha$, $\beta$ and the start point parameters:

For any value of $\alpha>0$ and $\beta>0$, there is only one real solution to the transcendental equation;

The exponential part (i.e., the $e^{-\beta\lambda^2}$ component) of the transcendental equation becomes progressively smaller but always remains positive as $|\lambda|$ becomes very large;

The complementary error function part (i.e., the $-\alpha\lambda Erfc(\lambda)$) component of the transcendental equation) is zero at $\lambda=0$, remains negative where $\lambda>0$ and approaches zero where $\lambda$ becomes very large—in other words, for all values of $\lambda>0$ the exponential part and the complementary error function part never intersect;

The complementary error function part (i.e., the $-\alpha\lambda Erfc(\lambda)$ component) of the transcendental equation) is zero at $\lambda=0$, remains positive where $\lambda<0$ and approaches a limit equal to 31 $2\alpha\lambda$ where $\lambda$ has a large negative value—in other words, for all values of $\lambda<0$ the exponential part and the complementary error function part only intersect once.

Figure 2:
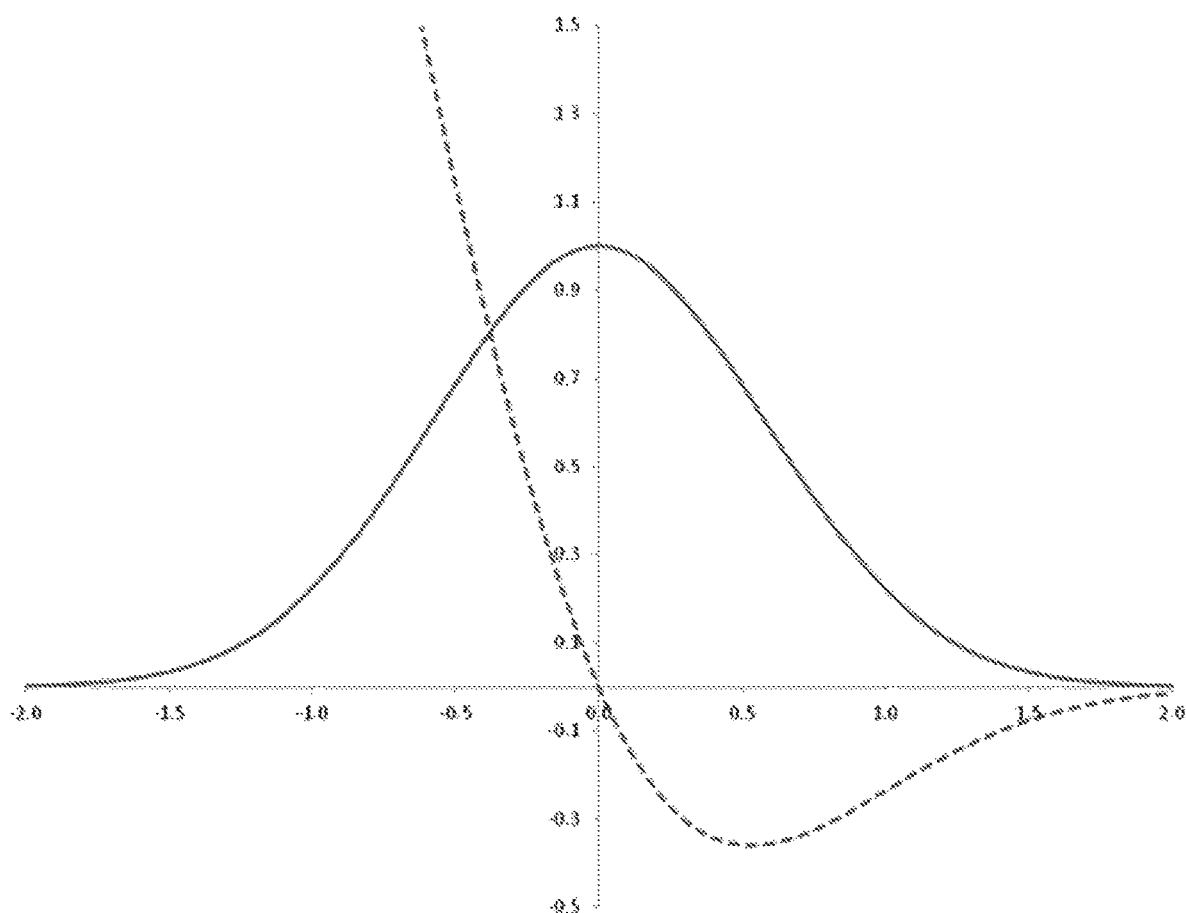
FIG. 2 is a graph of $e^{-\beta\lambda^2}$ and $-\alpha\lambda\mathrm{Erfc}(\lambda)$ components of a transcendental equation plotted against, $\lambda$ (shown on the horizontal axis), where a value of $\lambda$ for which the two curves intersect is the solution to the transcendental equation, where $\alpha$ and $\beta$ both equal 1.5.

FIG. 2 is a plot of the two components of the transcendental equation (eqn 1) (being the $e^{-\beta\lambda^2}$ and $-\alpha\lambda Erfc(\lambda)$ components of a transcendental equation plotted against, $\lambda$) in the case where $\alpha$ and $\beta$ are both equal to 1.5. Since the shape of the exponential component and complementary error function components remain the same for all values of $\alpha>0$ and $\beta>0$, any real number greater than zero can be used, in principle, which ensures that the solution is always a unique negative real number.

In some embodiments, the range of $\alpha$ and $\beta$ parameter values may be constrained to mitigate against the chance of the solutions of the transcendental equation being concentrated within a too small range of values of $\lambda$. In some embodiments, the value of the $\alpha$ parameter is selected to be a fixed real valued number that ranges between 1 and 8, and the value of the parameter is selected to be a fixed real valued number that ranges between 1 and 8. In some embodiments, the $\alpha$ and $\beta$ parameter values are selected from a smaller range, such as between 1 and 4. In some embodiments, the $\alpha$ and $\beta$ parameters are generated by using the following formulation:

$\alpha=C_1+C_2$ times a uniform random variable between 0 and 1 where $C_1$ is $\geq 0$ and $C_2$ is $>0$ or $C_1$ is $>0$ and $C_2$ is $\geq 0$ such that $\alpha$ is $>0$; and $\alpha=C_3+C_4$ times a uniform random variable between 0 and 1 where $C_3$ is $\geq 0$ and $C_4$ is $>0$ or $C_3$ is $>0$ and $C_4$ is $\geq 0$ such that $\beta$ is $>0$.

The uniform random variable may be obtained from: another pseudo random number generator, such as the Mersenne Twister PRNG, external sources of noise/randomness (e.g., externally generated entropy from a third party source or entropy generated by the system 102 or device on which the PRNG module 116 operates after appropriate whitening and processing), as for example, may be retrieved from the library 122; and/or an output from a prior iteration of the PRNG module 116 itself (e.g., using part or all of the output from prior computations of the numbers (i.e., decimal numbers, binary numbers or numbers that are neither decimal numbers nor binary numbers)) as may be retrieved from the library 122 such that a distinct transcendental equation is solved in each iteration of the PRNG module 116.

The typical "average" and "median" solution, $\lambda$, for various ranges of $\alpha$ and $\beta$ are summarised in Table 1 below:

TABLE 1

| $\alpha$ and $\beta$ Range Case | Indicated "Average" Solution Value for $\lambda$ | Indicated "Median" Solution Value for $\lambda$ |
|---|---|---|
| 1-2 | −0.381 | −0.375 |
| 2-3 | −0.266 | −0.266 |
| 3-4 | −0.203 | −0.201 |
| 4-5 | −0.165 | −0.165 |
| 5-6 | −0.142 | −0.142 |
| 6-7 | −0.123 | −0.122 |
| 7-8 | −0.109 | −0.109 |

The results tabled in Table 1 are examples of approximated solutions to the transcendental equation of eqn 1 for given $\alpha$ and $\beta$ ranges. These results have been rounded to three decimal places to help inform an appropriate choice of starting point where a fixed starting point for the "root finding" algorithms is desired in specific end uses.

In some embodiments, restrictions on the selection of $\alpha$ and parameters may depend on the application to which, for example, the pseudo random decimal numbers, binary numbers or numbers that are neither decimal numbers nor binary numbers are to be applied.

Similar considerations may apply to the selection of the start point k used for the "root finding" algorithms and, for example, in relation to eqn 1, the only specification needed is that it be a real valued number<0 (0 is never a solution of eqn 1) as the starting point.

If, however, the specific application requires the starting point to itself be an input driven by a random process, then the start point, k, may be selected, in relation to eqn 1, as follows:

k=$C_5$ times a uniform random variable between 0 and 1, where $C_5$ is <0

In some embodiments, a value for the start point k may be retrieved from previously generated pseudo random numbers as may be stored in library 122. This may be appropriate in particular in situations where a value for the start point k is required at start-up and there is an insufficient amount of on device entropy or entropy from a third party source and/or the use of a PRNG is not considered appropriate.

The initial values of $\alpha$, $\beta$ and the start point parameters for use in a root finding algorithm (as discussed below) may be seeded from on-device random noise or from a pre-existing pool of entropy stored in the library 122.

In some embodiments, the generation of pseudo random numbers may be achieved by calculating the value of a non-vanishing linear combination of a finite number of logarithms of non-zero algebraic numbers with algebraic coefficients where the constant term is not equal to zero.

For example, the transcendental equation may be represented by $e^{\beta_0}\alpha_1^{\beta_1} \ldots \alpha_n^{\beta_n}=\exp(\lambda)$ with the following analytic solution:

$$\beta_0+\beta_1 \cdot \ln(\alpha_1) \ldots +\beta_n \cdot \ln(\alpha_n)=\lambda \quad \text{(eqn 2)}$$

where the parameter $\beta_0$ is a non-zero algebraic number, the parameters $\beta_1 \ldots \beta_n$ are algebraic numbers, the parameters $\alpha_1 \ldots \alpha_n$ are non-zero algebraic numbers, n is any positive integer≥1 and $\lambda$ is the transcendental number whose value is to be calculated directly. Eqn 2 is an analytic solution of a transcendental equation whose exceptional set is countably finite in that it has no algebraic numbers in its exceptional set.

A specific example of a formulation that uses finite linear combinations of logarithms of non-zero algebraic numbers with algebraic coefficients as a means of generating transcendental numbers is as follows:

$$\beta_0+\beta_1 \cdot \ln(\alpha_1)=\lambda \quad \text{(eqn 3)}$$

where the parameter $\beta_0$ is a non-zero algebraic number, the parameter $\beta_1$ is an algebraic number, the parameter $\alpha_1$ is a non-zero algebraic number and $\lambda$ is the transcendental number whose value is to be calculated directly. Eqn 3 is an analytic solution of a transcendental equation whose exceptional set is countably finite in that it has no algebraic numbers in its exceptional set.

As with the transcendental equation described above (eqn 1), the values calculated on a computer or device using eqn 2 and/or eqn 3 are approximations to transcendental numbers.

In some embodiments, further restrictions to the coefficients (or parameters) may apply. For example, specific restrictions on values for the coefficients may be desirable for particular end use applications. In some embodiments, a specific end use application may require ranges for the values of the coefficients (i.e., the parameter $\beta_0$ and the parameters $\beta_1 \ldots \beta_n$) to be specifically constrained to ensure a given range of parameter values are used.

In some embodiments, the values for the $\beta_0$, $\beta_1$, and $\alpha_1$ parameters in eqn 3 may be obtained by using the following formulation:

$\alpha_1=K_3+K_2$ times a uniform random variable between 0 and 1, where $\alpha_1$ is >0 (this last restriction is required where the systems and computer-implemented methods are unable to deal with complex numbers);

$\beta_0=K_3+K_4$ times a uniform random variable between 0 and 1 where $\beta_0$ is algebraic and does not equal 0; and $\beta_1=K_5+K_6$ times a uniform random variable between 0 and 1 where $\beta_1$ is algebraic.

The uniform random variable may be obtained from: another pseudo random number generator, such as the Mersenne Twister PRNG; external sources of noise/randomness (e.g., externally generated entropy from a third party source or entropy generated by the system 102 or device on which the PRNG module 116 operates after appropriate whitening and processing), as for example, may be retrieved from the library 122; and/or an output from a prior iteration of the PRNG module 116 itself (e.g., using part or all of the output from prior computations of the numbers (i.e., decimal numbers, binary numbers or numbers that are neither decimal numbers nor binary numbers) as may be retrieved from the library 122 such that a distinct transcendental equation is solved in each iteration of the PRNG module 116.

The initial values of the parameter $\beta_0$, the parameters $\beta_1 \ldots \beta_n$ and the parameters $\alpha_1 \ldots \alpha_n$ may be seeded from on-device random noise or from a pre-existing pool of entropy stored in the library 122.

Solving Transcendental Equations

The PRNG module 116 may be configured to determine solutions to the transcendental equation using any suitable root finding algorithms where direct evaluation of the transcendental number using an analytic solution to the transcendental equation is not an available option. For example, appropriate algorithms may include numerical methods, such as Newton's method and its higher order forms such Halley's method or analytic formula approximation techniques such as homotopy analysis.

Numerical methods such as Newton's method and Halley's method may involve performing iterated steps to derive progressively improved estimates of the solution—by way of example, Newton's method, starting with an initial guess/estimate of the solution, $x_0$, to identify the value of x for which $f(x)=0$ is shown below where $f(x)$ is the transcendental equation and $f'(x)$ denotes the first derivative of $f(x)$ with respect to x:

$$x_{n+1} = x_n - f(x_n)/f'(x_n)$$

In the case of the transcendental equation in eqn 1 set out above, the equation is recast to determine the function $f(\lambda)$ for use in Newton's Method as follows (with $\lambda$ in place of x):

$$f(\lambda) = e^{-\beta\lambda^2} + \alpha\lambda Erfc(\lambda) = 0$$

Higher order methods, such as Halley's method, tend to be more complicated but offer an improved rate of convergence to the exact solution (i.e., it takes fewer iterations to achieve a given maximum error between the exact solution and the approximation at the expense of additional computational overhead).

The homotopy analysis approach presents the solution to the transcendental equation in terms of a Taylor series comprised of an infinite series of formulae based on the solution to a simpler but related mathematical problem. The first five terms of the homotopy series expression for the solution to the transcendental equation set out above (eqn 1) is shown below:

$$\lambda = X0/0! + X1/1! + X2/2! + X3/3! + X4/4!$$

where:

X0=the initial start point (or where the homotopy series is re-used in a series of calculations, the previously calculated approximate solution to the transcendental equation)

$$X1 = -\frac{e^{X0^2}\sqrt{\pi}\left(1 + e^{X0^2\beta}X0\alpha\text{Erfc}[X0]\right)}{-2e^{X0^2\beta}X0\alpha - 2e^{X0^2}X0\sqrt{\pi}\beta + e^{X0^2+X0^2\beta}\sqrt{\pi}\alpha\text{Erfc}[X0]}$$

$$X2 = \frac{2\left(-2e^{X0^2\beta}\alpha + 2e^{X0^2\beta}X0^2\alpha - e^{X0^2}\sqrt{\pi}\beta + 2e^{X0^2}X0^2\sqrt{\pi}\beta^2\right)X1^2}{2e^{X0^2\beta}X0\alpha + 2e^{X0^2}X0\sqrt{\pi}\beta - e^{X0^2(1+\beta)}\sqrt{\pi}\alpha\text{Erfc}[X0]}$$

$$X3 = -\frac{2X1\left(-8e^{X0^2\beta}X0\alpha X1^2 + 4e^{X0^2\beta}X0^3\alpha X1^2 - 6e^{X0^2}X0\sqrt{\pi}\beta^2 X1^2 + 4e^{X0^2}X0^3\sqrt{\pi}\beta^3 X1^2\right)}{2e^{X0^2\beta}X0\alpha + 2e^{X0^2}X0\sqrt{\pi}\beta - e^{X0^2(1+\beta)}\sqrt{\pi}\alpha\text{Erfc}[X0]} -$$

-continued $$\frac{2X1\left(6e^{X0^2\beta}\alpha X2 - 6e^{X0^2\beta}X0^2\alpha X2 + 3e^{X0^2}\sqrt{\pi}\beta X2 - 6e^{X0^2}X0^2\sqrt{\pi}\beta^2 X2\right)}{2e^{X0^2\beta}X0\alpha + 2e^{X0^2}X0\sqrt{\pi}\beta - e^{X0^2(1+\beta)}\sqrt{\pi}\alpha\text{Erfc}[X0]}$$

$$X4 = \frac{\left(2\left(8e^{X0^2\beta}\alpha X1^4 - 28e^{X0^2\beta}X0^2\alpha X1^4 + 8e^{X0^2\beta}X0^4\alpha X1^4 + 6e^{X0^2}\sqrt{\pi}\beta^2 X1^4 - 24e^{X0^2}X0^2\sqrt{\pi}\beta^3 X1^4\right)\right)}{2e^{X0^2\beta}X0\alpha + 2e^{X0^2}X0\sqrt{\pi}\beta - e^{X0^2(1+\beta)}\sqrt{\pi}\alpha\text{Erfc}[X0]} +$$

$$\frac{\left(2\left(8e^{X0^2}X0^4\sqrt{\pi}\beta^4 X1^4 + 48e^{X0^2\beta}X0\alpha X1^2 X2 - 24e^{X0^2\beta}X0^3\alpha X1^2 X2 + 36e^{X0^2}X0\sqrt{\pi}\beta^2 X1^2 X2\right)\right)}{2e^{X0^2\beta}X0\alpha + 2e^{X0^2}X0\sqrt{\pi}\beta - e^{X0^2(1+\beta)}\sqrt{\pi}\alpha\text{Erfc}[X0]} +$$

$$\frac{\left(2\left(-24e^{X0^2}X0^3\sqrt{\pi}\beta^3 X1^2 X2 - 6e^{X0^2\beta}\alpha X2^2 + 6e^{X0^2\beta}X0^2\alpha X2^2 - 3e^{X0^2}\sqrt{\pi}\beta X2^2 + 6e^{X0^2}X0^2\sqrt{\pi}\beta^2 X2^2\right)\right)}{2e^{X0^2\beta}X0\alpha + 2e^{X0^2}X0\sqrt{\pi}\beta - e^{X0^2(1+\beta)}\sqrt{\pi}\alpha\text{Erfc}[X0]} +$$

$$\frac{\left(2\left(-8e^{X0^2\beta}\alpha X1X3 + 8e^{X0^2\beta}X0^2\alpha X1X3 - 4e^{X0^2}\sqrt{\pi}\beta X1X3 + 8e^{X0^2}X0^2\sqrt{\pi}\beta^2 X1X3\right)\right)}{2e^{X0^2\beta}X0\alpha + 2e^{X0^2}X0\sqrt{\pi}\beta - e^{X0^2(1+\beta)}\sqrt{\pi}\alpha\text{Erfc}[X0]}$$

It is practically infeasible to carry out an infinite number of iterations using a numerical method or to compute the formulae for an infinite number of terms in a Taylor series-style of solution, considering the complexity of the $3^{rd}$, $4^{th}$ and $5^{th}$ terms in the homotopy series. Nonetheless, with such methods, it emerges that a relatively small number of iterations or terms comprising explicit formulae (depending on the solution methodology used) may be sufficient to obtain a suitable approximation to the exact the solution.

Practically speaking, because any computer on which the root finding algorithm is used can only carry a finite number of digits in its memory, the solutions calculated by PRNG module 116 by either a numerical approach or through a single formula are approximations: in the case of the numerical approach, the accuracy of the solution improves as the number of steps increases; and likewise, the analytic formula approximation approach involves generating a solution in the form of an infinite series which increases in accuracy as more terms are added to the series.

Properties of Transcendental Numbers Generated by the PRNG Module

As discussed above, the PRNG module 116 is configured to determine solutions to transcendental equations, such as eqn 1, to generate a finite sequence of digits which may, in circumstances where the precision of the calculation carried out by the PRNG module 116 is less than the number of digits generated, represent a portion of a transcendental number followed by a sequence of "residual digits" (i.e., the trailing digits that do not match the corresponding digits in the transcendental number to which the approximate solution relates).

In "almost all" instances, as mentioned above, the sequence of digits generated (including the residual digits) will correspond to a sample from a normal number and the overall sequence of digits will correspond to a series of these samples from different normal numbers as mentioned above. Accordingly, the aggregation of these sequences can be expected to display the properties of normality and can be expected to retain this property where conversion of, for example, decimal digits to bits occurs or where bits are generated directly. Furthermore, in software utilised by the PRNG Module 116, the mathematical precision can usually be set to ensure that the approximate solution matches the exact solution of the transcendental equation to the extent of the available pre-set floating point precision of the software.

In general, random number generators face a limitation imposed because of the limited number of digits carried in the machine, such as system 102, on which the PRNG module 116 is deployed. It is it inevitable that at some point a repeated result will emerge in terms of the approximate solutions to the transcendental equation as determined by the PRNG module 116 (this is known as the "Birthday Problem"). This may be alternately phrased as the number of random samples needing to be drawn from a finite population before the probability of at least one repeated result (i.e., a "birthday collision") occurring exceeds a given threshold.

For the described embodiments, a limiting factor may be the number of digits (i.e., decimal digits, binary digits or digits that are neither decimal digits nor binary digits) produced by the PRNG module 116 when a transcendental number is generated. In an embodiment where the PRNG module 116 is configured to solve eqn 1 to generate a 384 decimal digit solution as an output where the decimal digits are converted to 0's or 1's depending on the digits being even or odd numbers, the corresponding approximate birthday problem probabilities are set out in Table 2 below.

TABLE 2

| Probability of at Least One Repeated Result (Threshold Probability) | Total Possible Outputs | Approximate Number of Random Samples (to 2 Significant Figures) |
| --- | --- | --- |
| $10^{-6}$ | $2^{384}$ = approx. $3.9 \times 10^{115}$ | $8.9 \times 10^{54}$ |
| $10^{-9}$ | $2^{384}$ = approx. $3.9 \times 10^{115}$ | $2.8 \times 10^{53}$ |
| $10^{-12}$ | $2^{384}$ = approx. $3.9 \times 10^{115}$ | $8.9 \times 10^{51}$ |
| $10^{-15}$ | $2^{384}$ = approx. $3.9 \times 10^{115}$ | $2.8 \times 10^{50}$ |

Table 2 shows how the potential range of outcomes needs to be much larger than the expected number of likely specific numbers generated so that the probability of the birthday problem arising is reduced to what is judged to be a "low probability". The birthday collision risk is directly related to the number of digits used in the generation of the transcendental number. The greater the number of digits used in the generation of the approximation of a transcendental number and in the resulting bit stream, the lower the risk of a birthday collision for a given number of random samples. Accordingly, the risk of a birthday collision can be reduced by constructing each specific version of the PRNG to carry a sufficiently large number of digits such that the probability of a "birthday collision" (i.e., a repeated result) can be made to be acceptably low given the context in which the PRNG is being used. For example, if the total size of possible binary outcomes from a PRNG is $2^{384}$, then the total number of binary digits is 384. If a PRNG carries 384 binary digits, then the probability of at least one birthday collision reaching, say, $10^{-6}$, arises after approximately $8.9 \times 10^{54}$ separate sets of 384 bit length numbers have been generated (which is a number very materially less than the total range of $2^{384}$ different possibilities (i.e., approx. $3.9 \times 10^{115}$ different possibilities)).

With the described systems and methods, "almost all" of the decimal numbers, binary numbers or numbers that are neither decimal numbers nor binary numbers generated by the PRNG module 116 are samples of normal numbers in all bases and the various parameters used collectively contain a number of digits far exceeding the size of the output of the PRNG module 116.

Methods of Generating Pseudo Random Numbers

Figure 3:
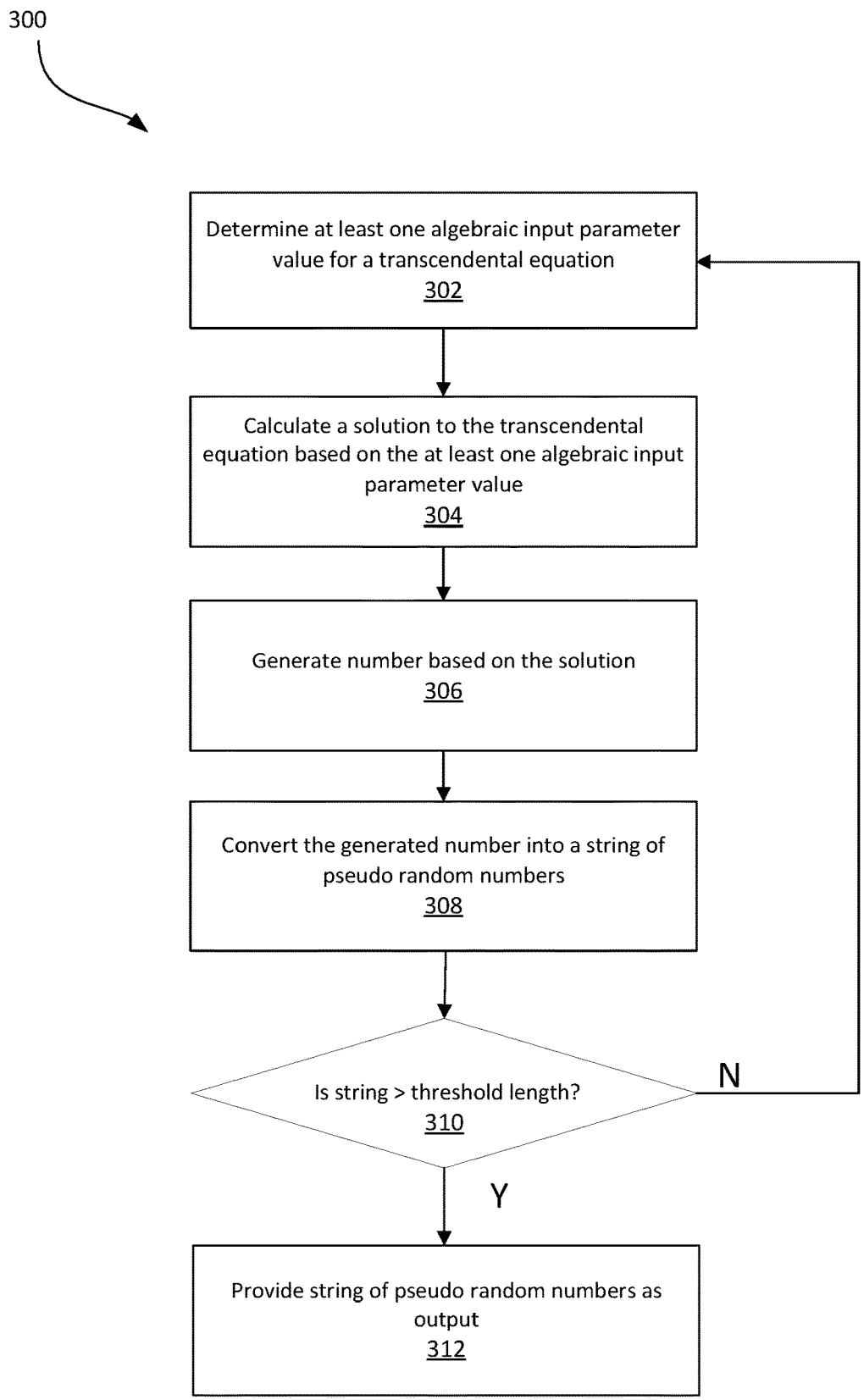
FIG. 3 depicts a process flow diagram of a computer-implemented method of generating binary strings of pseudo random numbers, according to some embodiments.

Referring now to FIG. 3, there is shown a process flow diagram of a computer-implemented method 300 of generating pseudo random numbers, according to some embodiments. For example, the pseudo random numbers may be decimal numbers, binary numbers or numbers that are neither decimal numbers nor binary numbers.

In some embodiments, the method is performed by the system 102 of FIG. 1. For example processor(s) 112 may execute instructions of the PRNG module 116 to cause the system 102 to perform the method 300.

At 302, the system 102 determines at least one algebraic input parameter value for a transcendental equation. In some embodiments, at least one algebraic input parameter value is determined from data received from data source 124, which may be a source of random noise, such as an external entropy source. In some embodiments, at least one algebraic input parameter value is selected or obtained from a pool or plurality of previously generated pseudo random digits or numbers, for example, as may be stored in a database, such as library 122. For example, the pool or plurality of previously generated pseudo random digits may be generated according some or all of the steps of method 300 of FIG. 3. In some embodiments, the at least one algebraic input parameter value for generating a pseudo random number value is selected from the pseudo random number value generated, for example, in an immediate preceding iteration of method 300. In some embodiments, the at least one algebraic input parameter value is received from data source 124, which may be an interface arranged to receive information for a user or another device which is required to be hashed.

The transcendental equation comprises a transcendental function of the variable being solved for that is configured to or capable of generating transcendental number outputs from algebraic number inputs. In embodiments where the transcendental function of the transcendental equation is associated with an exceptional set that is countably finite (such as eqn 1), it may be possible to select the at least one input parameter values to ensure that the solution to the transcendental equation is a transcendental number. In some embodiments, the transcendental equation is the transcendental equation of eqn 1 and/or the transcendental equations for which eqn 2 and/or eqn 3 are the solutions as described above. Where eqn 1 is being used, the at least one algebraic input parameter values comprise values for the start point k, and parameters $\alpha$ and $\beta$ and that k<0 and $\alpha$ and $\beta$ are both >0. Where eqn 2 is being used, algebraic input parameter values are required for $\beta_0, \beta_1$, and $\alpha_1$ with the additional constraints that $\beta_0$ is not equal to 0 and that $\alpha_1 > 0$ (this last restriction is required where the systems and computer-implemented methods are unable to deal with complex numbers). Where eqn 3 is being used, algebraic input parameter values are required for $\beta_0 \ldots \beta_n$, and $\alpha_1 \ldots \alpha_n$ with the additional constraints that $\beta_0$ is not equal to 0 and that $\alpha_1 \ldots \alpha_n$ are all individually >0 (this last restriction is required where the systems and computer-implemented methods are unable to deal with complex numbers).

At 304, the system 102 calculates a solution to the transcendental equation based on the at least one algebraic input parameter value and at 306, generates a number based on the solution. In some embodiments, the generated number is an approximation of the solution to the transcendental equation, such as an approximation to a transcendental number.

For example, the system 102 may calculate a solution to the transcendental equation using any suitable root finding algorithmic method, such as a numerical method or an analytic formula approximation technique, such as those discussed above.

At 308, the system 102 may convert the generated number into a decimal value between 0 and 1 and/or a sequence of pseudo random numbers as bits (base 2), as decimals (base 10) or some other base. For example, the system 102 may convert the generated number into a sequence of pseudo random numbers with bases other than 2 or 10.

In some embodiments, the system 102 converts the generated number, which may be an approximation to a transcendental number, into a decimal value between 0 and 1. This may be achieved by removing the negative sign from the generated number, if necessary, and multiplying the result by $10^n$ (where n is a positive integer the choice of which may depend on the particular application, for example, an integer>10) and removing the digits to the left of the decimal point to produce a decimal between 0 and 1. For example, where eqn 1 is being used, n may be selected as being a positive integer>10. Where eqn 2 or eqn 3 is being used, n may be selected as being a positive integer>20.

The system 102 may also convert the decimal value into an integer string or a binary string of pseudo random numbers. In some embodiments, the decimal may be broken into a digit string before being converted to the binary string, for example, as may be desirable for a particular end use application.

In some embodiments, converting the generated number into the binary string comprises assigning one of a zero or a one to each even digit of the decimal value and assigning the other of a zero or a one to each odd digit of the decimal value. In some embodiments, the method further comprises determining which one of a zero or a one to assign to each even digit and each odd digit of the decimal value by determining whether (i) the decimal value, or, alternatively, (ii) a decimal generated in a prior iteration, is greater than 0.5. In some embodiments, converting the decimal value into the binary string of pseudo random numbers by replacing each digit of the decimal value with the last bit of the equivalent ASCII character.

In other embodiments, converting the generated number into the binary string comprises conversion of the generated number into an integer based on the digits following the decimal point, determining an equivalent binary value of the integer; and determining the binary string of pseudo random bits as being the determined equivalent binary value of the integer. For example, this may involve restating the string of decimal digits as an n digit integer and then converting this integer into its equivalent binary format or having the decimal digits stated directly in their binary equivalent. In some embodiments, retention of the leading zero's may be desirable to preserve the normality property.

In some embodiments, the system 102 may generate the sequence or string of pseudo random numbers by performing steps 302 to 308 of method 300 to determine the generated numbers based on approximate solutions to the transcendental equation. In some embodiments, multiple iterations of steps 302 to 308, and in some cases 1,000 or 10,000 or some different number of iterations or re-use cycles, may be performed to generate a sequence of numbers (for example, decimals). For example, the system 102 may convert the generated number into a decimal value between 0 and 1 and may use the decimal(s) generated at 308 as input parameter value(s) for the transcendental equation and the process may be repeated in this way multiple times. In some embodiments, the system 102 may only retain a subset of the most recent pseudo random numbers, for example, the last one or two sequences of decimals or an arbitrary number of decimals and convert them to a string of pseudo random numbers as an output. The decimals generated in the intervening steps may not be retained by the system 102, and for example, may be removed from the system 102 once they have been used.

In some embodiments, part of the outputs from the prior computational step are exclusively used for the next input parameter values in the next step to make backwards and forwards computation of the outputs more difficult by an individual or computer system with access only to the pseudo random number value output. For example, the system 102 may be configured to generate a first sequence of numbers (e.g., decimals) and a second sequence of numbers (e.g., decimals), wherein the pseudo random number value output is selected from the first sequence of numbers and the input parameter value for calculating the subsequent pseudo random number value is selected from the second sequence of numbers. In some embodiments, for example, the system 102 may be configured to generate a first sequence of numbers, and the pseudo random number value output may be selected as a subset of the sequence of pseudo random numbers, such as the last one number or last two numbers, or any arbitrary number of numbers, in the sequence of numbers.

In some embodiments, at 310, the system 102 may determine whether or not the pseudo random number or sequence of pseudo random numbers or binary string is greater than a threshold length. For example, where the pseudo random numbers are in the form of binary strings, this may involve combining the binary string determined at 308 with previously generated binary strings. If the binary string is not greater than the threshold length, the system 102 may again perform the steps of 302 to 308 to generate a further binary string to be combined with the previously generated binary string. The threshold length may, for example, be dictated by the end use application. In some embodiments, different values for the input parameters for the transcendental equations are used compared to those used for the previous iteration. In some embodiments where eqn 1 is being used, the same starting point k value may be used. However, in some embodiments, for example, where the binary string is to be applied in a security oriented setting, a different k can also be used for each iteration.

If the pseudo random number or sequence of pseudo random numbers is greater than the threshold length, at 312, the system 102 provides the pseudo random numbers as an output. In some embodiments, the system 102 may be configured to select a subset of the digits of the pseudo random number(s) as the output. In other embodiments, the entirety of the pseudo random number or the sequence of pseudo random numbers is selected as the output.

In some embodiments, the system 102 provides the output to the application specific module(s) 120. In some embodiments, the system 102 is configured to transmit the output to one or more external or remote systems or devices, for example, via the communications network 104, or to save the output in library 122.

Specific Applications—Processing or Transforming Data

The application specific module(s) 120 may be a data processing or data transformation module 120. For example, in some embodiments, the application specific module(s)

120 may be configured to cooperate with the PRNG module 116 (and in some embodiments, the converter module 118), to de-bias and/or condition data, such as raw entropy output, from a TRNG. In some embodiments, the application specific module(s) 120 may be configured to cooperate with the PRNG module 116 (and in some embodiments, the converter module 118), to perform as a hashing function to generate a hash of input data. For example, the data source 124 of FIG. 1 may be a raw entropy source configured to provide raw entropy to the system 102 or may be an interface configured to provide the system with sensitive data for hashing, such as a user or input interface or device interface.

As discussed above, existing TRNGs tend to have drawbacks associated with them. For example, all TRNG's (whether utilising a quantum or classical physical randomness source) produce raw bits from their respective entropy sources that are: (i) biased (i.e., the proportion of 1's and 0's tend to not equal 50% in the long run); and (ii) correlated within the bit stream (i.e., there tends to be a measurable autocorrelation within the raw bit stream samples generated in the long run).

Both the bias and the autocorrelations in the raw bit stream output are detectable and distinguishable from random binary data. Accordingly, many TRNG's use some form of software processing of the raw binary output to improve its statistical properties—choices for this de-biasing/conditioning (also known as post-processing) step include various PRNGs, hashing algorithms and cryptographic algorithms.

The typical approach for post-processing of a TRNG's raw entropy output is to: (i) conduct health checks on the raw entropy (and on the various components in the TRNG); and (ii) process the raw entropy through de-biasing/conditioning software. This process necessarily involves a reduction in the total useable bits produced and can conceal material failures in the operation of the entropy source. The quality of a TRNG's bit stream output depends not only on the quality of the underlying entropy source but also on the quality of the post-processing software. Deficiencies in this software can create the potential for the output from the TRNG to display, over a sufficiently long output stream, detectable bias and auto-correlation as a result.

As outlined above, using an existing PRNG for de-biasing and conditioning is potentially problematic. Many PRNGs are vulnerable to: (i) poorly chosen seeds such that the PRNG enters a small cycle or takes a significant amount of time to generate uncorrelated bits from the starting seed, etc.; (ii) generation of detectable biases and correlations with the bit stream output; and (iii) reverse engineering of their outputs.

This is thought to be because most PRNGs in widespread use are ad hoc designs and formal mathematical proof regarding the statistical properties of the output is often limited or lacking. Even though some properties related to security (e.g., the size of the state space, expected or actual cycle length or the probability of a collision) can be measured, verification of the statistical properties of most PRNGs is essentially an empirical undertaking.

The same point can be made in relation to hash functions used to de-bias and condition the raw entropy from a hardware source—most hash functions operate in a similar fashion to block ciphers including many well-known hash functions such as MD4, MD5, SHA-1 and SHA-2.

As testing and analysis of PRNGs and hash functions has advanced over time, many well-known PRNGs and hash functions have been found to be deficient (e.g., RC4, Mersenne Twister, MD4, MD5, etc.). Accordingly, there is an uncertainty whether or not a particular PRNGs or hash function's statistical behaviour is fully understood when a mathematical proof is incomplete or lacking. Since analysis of PRNGs and hash functions is an ever developing field, there is no assurance that an attack that is considered difficult today on a given PRNG or hash function won't be feasible at some point in the future.

The pseudo random numbers produced by the PRNG module 116 of the system 102 described with respect to FIG. 3 tend to have excellent statistical properties and can be used as a single step for post-processing of the raw entropy output from a TRNG, thereby mitigating or alleviating potential points of failure in existing TRNG raw entropy post-processing software. In other words, using the PRNG module 116 as the post-processing software for the raw entropy output of a TRNG combines both the inherent unpredictability of the underlying raw entropy source and the excellent statistical properties of the pseudo random numbers provided by the PRNG module 116. Accordingly, the pseudo random numbers generated by the PRNG module 116, which have known theoretical properties and excellent empirical statistical performance, can be used to de-bias and/or condition raw entropy output from a TRNG.

Similarly, a hash function based on the pseudo random numbers generated by the PRNG module 116 may be superior to known hash function designs due to excellent statistical properties and flexibility of the PRNG module 116 in terms of the size of inputs and outputs that can be processed.

As noted above, a hash function is an algorithm used to map (i.e., transform) data of an arbitrary size to a fixed size value (i.e., the hash) that possesses one or more of the following characteristics: (i) Deterministic; (ii) Uniformity of the outputs; (iii) Collision resistance; (iv) Excellent diffusion/avalanche properties; (v) Irreversibility; and/or (vi) Unpredictable outputs.

Broadly speaking, hash functions are built along the following lines: (i) a fixed-size component like a compression function (e.g., a block cipher) or fixed permutation; plus (ii) processing of the compression function/fixed permutation output to build variable-length strings up to some large maximum length (i.e., this is referred to as a domain extender); that said, sometimes the hash function is based on the fixed size component alone.

Where the compression function is combined with a domain extender to build a hash function, its security properties are derived from the compression function or directly from the underlying components of the compression function. Where the hash function is built directly from the fixed size component, e.g., a fixed permutation, the security properties of the hash function are derived from the fixed component. Most hash functions operate in a similar fashion to block ciphers—many well-known hash functions, including MD4, MD5, SHA-1 and SHA-2 are built from block-cipher-like components.

The core issue underlying the design, development and use of hash functions is that very few hash functions are based on mathematical problems (where the security can be assessed from a theoretical analysis of the hash function). Almost all hash functions in widespread use are ad hoc designs where the bits of the input data are mixed to produce the hash as outlined above—the process of mixing the bits is structured to make it difficult to break but no formal mathematical proof is provided. The practical result is that verification of the properties of hash functions is essentially an empirical undertaking.

Since cryptanalysis of hash functions is an ever developing field, there is no assurance that an attack that is considered difficult today on a given hash function won't be feasible at some point in the future (a good example of a hash function once in wide use that was overtaken by developments in cryptanalysis is MD5—this hash had poor collision resistance and, as a result of advances in computing power since it was introduced, it is easy to identify different hash inputs that give the same hash output).

The pseudo random numbers produced by the PRNG module 116 of the system 102 described with respect to FIG. 3 tend to have excellent statistical properties and can be used as a hash function. For example, the PRNG module 116 may be configured to determine one or more input parameters from data to be hashed, and to produce (for example, after a pre-set number of cycles), a bit stream output, part of which corresponds to the hash output. The statistical properties of the hash outputs reflect the fact that PRNG module 116 output bit stream is comprised of samples of bits taken from, in almost all cases, normal numbers. As such, a hash function based on the PRNG module 116 has excellent verifiable security properties.

The PRNG module 116 when used to de-bias and/or condition data, such as a raw entropy output from a raw entropy source such as data source 124, or to perform a hashing function, provides bit stream outputs with high quality statistical properties that are based upon samples of bits taken from, in almost all cases, normal numbers derived from the solutions to transcendental equations:

Theoretically and Empirically Verified Uniform Output— The uniformity of the output is as a result of the statistical properties of the numbers produced (i.e., they are samples from normal numbers in almost all instances)—empirical testing carried out confirms the theoretical basis of the outputs. For example, the PRNG module 116 when operating as a hash function, provides for excellent diffusion/avalanche properties in the hash output;

Collision Risk Can Be Made Arbitrarily Small—The ability to arbitrarily enlarge the number of digits used in the parameter inputs and the output stream (whether comprising decimal numbers, binary numbers or numbers that are neither decimal numbers nor binary numbers) means that the birthday collision probabilities (a feature of all PRNGs) can be made arbitrarily small; this is achieved by increasing the floating point precision of the calculations carried out within the PRNG module 116 thereby making the state space correspondingly larger. This may be of particular relevance in those instances where, for example, the underlying entropy source experiences intermittent availability of entropy or the raw entropy output is interrupted and part of the output bit stream is diverted to serve as input parameters, as discussed in more detail below;

Unpredictability of Outputs and Excellent Resistance to Reverse Engineering and Brute Force Attacks—In some embodiments, especially those related to the processing of raw entropy, predicting future outputs based on the bits already produced by the PRNG module 116 is likely limited to brute force attacks since the raw entropy source itself is inherently unpredictable and the PRNG module 166 output bits tend to be statistically indistinguishable from a random source of bits.

In some embodiments, if the underlying entropy source experiences intermittent availability of the raw entropy or the raw entropy output is interrupted, part of the output bit stream is diverted to serve as input parameters and is then discarded. In this situation, the future outputs may be still unpredictable because the portion of the output used for input parameters are used by the PRNG module 116 itself and are not provided to the application consuming the TRNG's output.

Similarly, where underlying raw entropy source experiences intermittent availability of raw entropy or the raw entropy output is interrupted: the truncating and discarding of an arbitrary number of leading digits from the approximate transcendental numbers generated in each step limits reverse engineering of the prior parameter inputs based on previous outputs to brute force attacks; and increasing the number of digits computed for each approximate transcendental number makes the reverse engineering the outputs based on brute force attacks correspondingly more difficult; and Excellent Pre-image Resistance—In some embodiments, especially those relating to hashing, an arbitrary number of leading digits can be truncated from the approximate transcendental numbers generated in each step or iteration and can be used to make reverse engineering the input from any given output via a brute force attack likely to be infeasible—it has excellent irreversibility and pre-image resistance properties;

Flexible Input and Output Size—When used to perform a hashing function, the PRNG module 116 can be configured to accept arbitrary (but finite) length inputs by extending a number of sequential input parameters needed to process the hash input—this is subject only to the time needed to process the data being hashed. In some embodiments, for example where the input data is relatively small, it can be padded out with a salt to ensure that the collision risk is reduced to an acceptable level. The PRNG module 116 can be configured to produce arbitrary length outputs comprised of n bits even if no parameters are changed by simply retaining the last n bits produced as the output hash without detriment to the statistical properties of the output—in this regard, the hash function based on the PRNG module 116 is extremely flexible; and Simplicity, Low Computational Overhead—The simplicity of the PRNG module 116 means that the raw entropy is de-biased and conditioned directly via the PRNG module 116 in a single step reducing computational overhead. Similarly, the simplicity of the PRNG module 116 means that the hash output is produced directly via the PRNG module 116—there is no need for a domain extender which reduces the software computational overhead and simplifies the hashing process.

Unlike many other PRNGs, the statistical properties of the PRNG module 116 outputs are an artefact of the normality property of the numbers from which the samples of digits were taken. In other PRNGs the statistical properties of the output arise because of the complexity of the underlying computations in the algorithm. Unlike many other PRNGs in common use, the well understood mathematical underpinnings of the PRNG module 116 do not leave potential blind spots open for exploitation—this coupled, as noted above, with the ability to arbitrarily and easily enlarge the state space of the RNG algorithm are likely to make it highly resistant to future advances in computing technology.

The PRNG module can operate on a lightweight chip which, for current purposes, is taken to be a device capable of running SSL encryption, typically in the order of 200+

MHz and, as such, is suitable where the PRNG module is required to operate in low-power, constrained environment.

Figure 4:
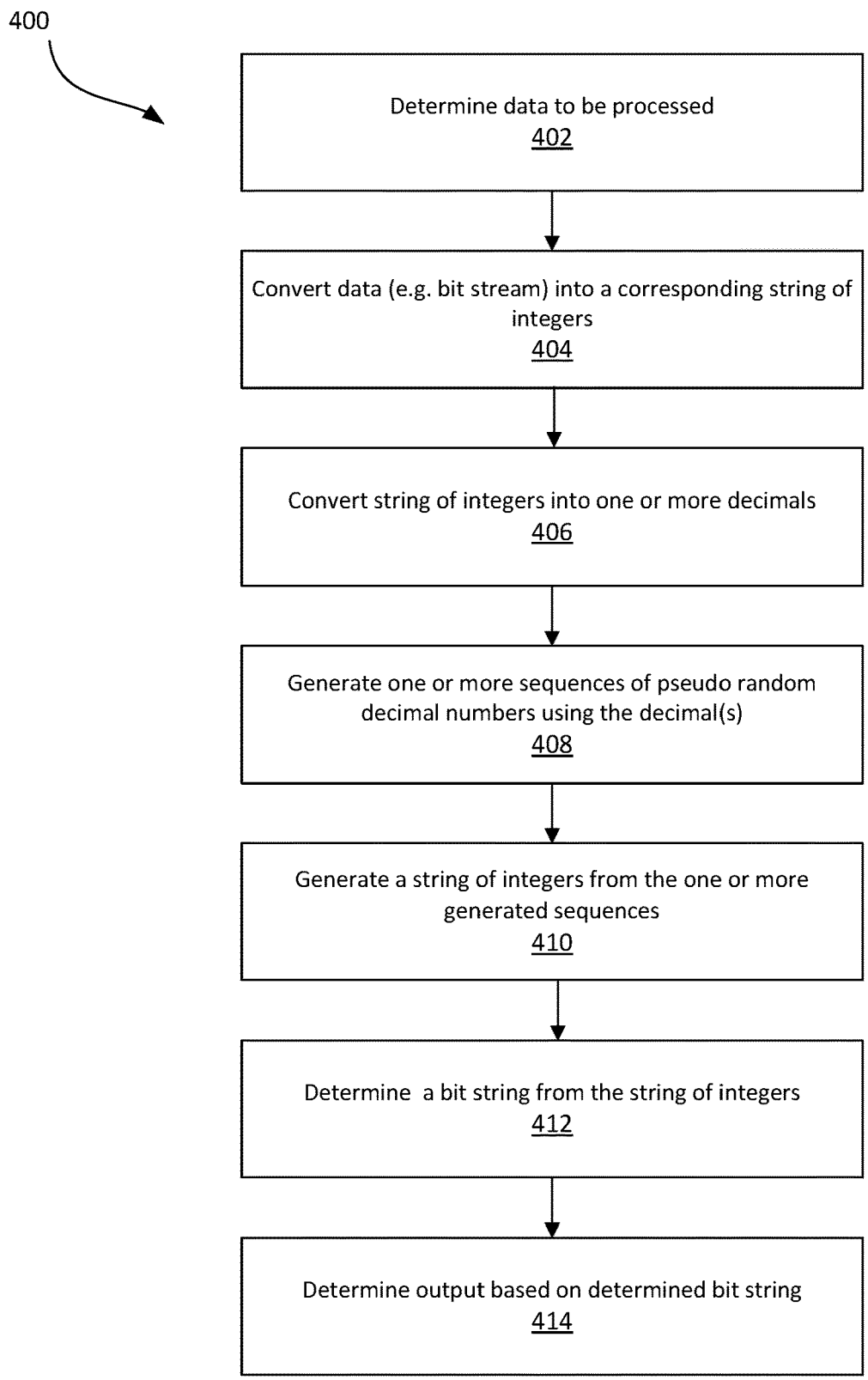
FIG. 4 depicts a process flow diagram of a computer-implemented method of processing or transforming data, according to some embodiments.

Processing or Transforming Data, for Example, to De-Bias and Condition TRNG Raw Entropy Output or to Hash Data, or Generate a Hash—Example Referring to FIG. 4, there is illustrated a process flow diagram of a computer-implemented method 400 of processing or transforming data.

For example, the data processing may be performed to de-bias and/or condition a raw entropy output from the data source 124, such as a raw entropy source, according to some embodiments. In some embodiments, the PRNG module 116 may be installed at the point of manufacture of the data source 124, or deployed on a device or system comprising the data source 124, with the raw entropy source providing data, for example, bits, for use as the input parameter(s) for the PRNG module 116. In this way, the unpredictability of the raw entropy source is utilised by the PRNG module 116 and the output retains the unpredictable character of the raw entropy but acquires the excellent statistical properties of the PRNG module 116.

In other embodiments, the data processing may be performed to generate a hash (or to hash data). For example, the method 400 may be a hashing function. For example, the system 102 may be configured to receive data to be hashed from a data source 124 such as an input interface via which a user can input a password, a file, or sensitive data which is required to be hashed.

In some embodiments, the method 400 is performed by the system 102 of FIG. 1. For example, the application specific module(s) 120 may be a raw entropy de-biasing and conditioning application or a hashing function, and may be configured to cooperate with the PRNG module 116, the data source 124, and in some embodiments, the converter module 118, to perform the method 400.

At 402, the system 102 determines data to be processed. For example, the data may comprise raw entropy to be de-biased and conditioned or whitened, or the data may comprise data to be hashed. The data may be in the form of a bit string. For example, the bit string to be hashed may comprise passwords, usernames, file details, or other potentially sensitive data received from the data source 124. In some embodiments, the data to be processed is received from as a raw entropy output from the data source 124.

The system 102 may determine one or more input parameter values for the PRNG module 116 from the data to be processed. The input parameter value(s) may be algebraic numbers.

In some embodiments, the data, in the form of a bit string or some other form, is converted, at 404, by the system 102, to a corresponding string of integers. For example, data in the form of a bit string may be converted into a corresponding string of integers by converting the bit string from binary to decimal. In other embodiments, the data to be processed may be determined or received by the system at 402 in the form of a string of integers.

In some embodiments, at 406, the system 102 converts the string of integers into at least one decimal between 0 and 1. For example, the system 102 may take the integer string and divide by $10^n$ where n is the number of digits in the integer string (including leading zeroes).

In embodiments, where two or more decimals between 0 and 1 are determined, the two or more decimals may have an equal number of digits.

At 408, the system 102 generates one or more sequences of pseudo random numbers using the at least one input parameter value, for example, the decimal(s) determined at 406. For example, the system 102 may generate a sequence of pseudo random decimal numbers by performing at least steps 302 to 308 of method 300 to determine the generated numbers based on approximate solutions to the transcendental equation. For example, the system 102 may generate one or more sequences of pseudo random numbers by calculating at least one solution to one or more transcendental equations using the at least one input parameter value, wherein the one or more transcendental equations comprise a transcendental function that is capable of generating transcendental number outputs from algebraic number inputs.

The system 102 may convert the generated number into a decimal value between 0 and 1 as outlined above. For example, this may be performed in a manner similar to that described above with reference to step 308 of method 300. In some embodiments, the system 102 may use the decimal(s) generated at 406 as input parameter values for the transcendental equation of method 300 and the process may be repeated in this way multiple times.

In some embodiments, and as discussed above with reference to FIG. 3, multiple iterations of steps 302 to 308, and in some cases 1,000 or 10,000 or some different number of iterations or re-use cycles, may be performed to generate a sequence of pseudo random numbers (i.e., decimal numbers, binary numbers or numbers that are neither decimal numbers nor binary numbers). In some embodiments, the system 102 may only retain the most recent sequence of pseudo random numbers, for example, for determining the output. The sequence of pseudo random numbers (i.e., decimal numbers, binary numbers or numbers that are neither decimal numbers nor binary numbers) generated in the intervening steps may not be retained by the system 102, and for example, may be removed from the device on which the method is being performed operates once they have been used. In some embodiments, only part of the outputs from the prior computational step are exclusively used for the next input parameter values in the next step to make backwards and forwards computation of the outputs more difficult by an individual or computer system with access only to the pseudo random number value output. In some embodiments, the system 102 may be configured to hide or not provide the sequence(s) of pseudo random numbers (i.e., decimal numbers, binary numbers or numbers that are neither decimal numbers nor binary numbers) used as input parameter values for the transcendental equation from any application or device to which the output is to be provided for consumption.

At 410, the system 102 may convert a subset of the pseudo random number, such as the last one pseudo random number (i.e., decimal numbers, binary numbers or numbers that are neither decimal numbers nor binary numbers) or last two pseudo random numbers, or any arbitrary number of pseudo random numbers generated into one or more respective sets of integers and combine or concatenate these sets of integers to generate a single string of integers. For example, the system 102 may take the decimal(s) and multiply by $10^n$ where n is the number of digits in the decimal string(s) (including leading zeroes).

In some embodiments, the system 102 may, for example, generate a second sequence or stream of pseudo random numbers using the at least one number determined at 406, wherein a first of the one numbers used as a first input parameter value for the transcendental equation at 406 is now used as the second input parameter value for the transcendental equation and a second of the at least one number used as the second input parameter value for the transcendental equation at 406 is now used as the first input parameter value for the transcendental equation, i.e., the values for the input parameters are swapped for steps 408 and 410. The system 102 may then combine the first and second sequences of pseudo random numbers to generate the single string of integers.

At 412, the system 102 may determine or extract a bit string from the single string of integers. For example, data in the form of a single string of integers may be converted into a corresponding string of bits by converting the integer string from decimal to binary.

At 414, the system 102 determines an output based on the generated one or more sequences of numbers, or for example, based on the determined bit string. For example, where raw entropy is to be de-biased and/or conditioned and/or whitened, the system 102 may determine the output as the de-biased and conditioned raw entropy of the data received from the data source 124. In some embodiments, where the data is to be processed to generate a hash, the system 102 may convert the determined bit string into hexadecimal text for use as the hash and determine the output as the hexadecimal text.

The system 102 may be configured to transmit the output to one or more external or remote systems or devices, for example, via the communications network 104, or to save the output in library 122.

In some embodiments, the system 102 or application the specific module(s) 120 may be configured to monitor the PRNG module and/or the data source 124 to determine when the underlying entropy source experiences intermittent availability of entropy or the raw entropy output from the data source 124 is interrupted. In response to detection of interruption of the raw entropy output from the data source 124, the system 102 may be configured to divert at least a portion of, for example, the decimal(s) generated at 406 as input parameter values for the transcendental equation of steps 302 to 308 of method 300, which may be then discarded, and the process may be repeated in this way multiple times until such time when the raw entropy source is restored or can produce sufficient entropy to meet the design requirements. Similarly, in response to detection of rectification of the interruption, the system 102 may be configured to revert to determining input parameter values for the transcendental equation from the received data. Accordingly, in situations where the data source 124 of raw entropy is interrupted or fails, and as a result, the data provided by the data source is potentially insufficient to meet the design requirement, there is a risk of entropy starvation on the system 102. However, by diverting at least a portion of the decimal(s) generated at 406 as input parameter values for the transcendental equation of steps 302 to 308 of method 300, the PRNG module 116 can generate pseudo random numbers until any such fault is remedied or rectified.

In some embodiments, where the data is being processed to generate a hash, there may be additional data, for example, as generated by a separate process using system 102, that is added to the data to be hashed (i.e., a salt) in order to improve the resistance of the hash algorithm to brute force attacks by making the bit string to be hashed larger.

The described systems and methods may be particularly beneficial for use in hashing functions for cryptographic and non-cryptographic purposes for the following reasons:

It is deterministic in that the same data used for hashing will produce the same hash output;

The normality property the output from each step of the described method 400 will "almost always" be retained in the bit strings captured at the end of the process (i.e., the distribution of bits within the output string may "almost always" display the same normality characteristic);

The described systems and methods exhibit good avalanche properties in testing;

The described systems and methods tend to compute the output quickly relative to other PRNG systems due to fewer iterative steps in the calculation of the pseudo random numbers;

In some embodiments, the number of steps and the number of digits used in the described systems and methods make a brute force computation difficult because of the non-retention of the intervening steps as the calculations progress; and In some embodiments, the number of steps and the number of digits used in the described systems and methods make a "birthday" collision unlikely.

Statistical Testing Performance of the PRNG Module

Extensive statistical testing of the PRNG module 116 (which generates pseudo random numbers based on approximations to transcendental numbers by solving transcendental equations) was performed using the PractRand battery of statistical tests and has confirmed that the pseudo random numbers generated (after conversion to a bit stream) do have the expected statistical properties of normality implied by mathematical theory. In terms of empirical tests of PRNGs, PractRand is the leading statistical test package available—it detects the greatest number of deficiencies in the greatest number of RNGs compared to other generally available test packages and, unlike its competitors, has no upper limit on the amount of data it can analyse. In fact, there are many PRNGs which pass simpler test packages, such as Diehard, that fail PractRand convincingly.

In some embodiments, the PRNG module 116 can produce extremely long sequences of statistically high quality bits and can do so from a single starting seed or from parallel instances of the RNG from distinct starting seeds: (i) a simplified version of the PRNG (coded in C) passed the PractRand test package at 32 terabytes (the default ceiling for the PractRand test package) in June 2020 based on a single starting seed (refer to the PractRand output shown below); and (ii) the same version of the PRNG (coded in C) has twice passed the PractRand test package at 256 terabytes based on 10 parallel instances with distinct starting seeds in two separate tests completed in June and August 2020.

These empirical results confirm that the outputs from the PRNG module 116 possess the statistical properties implied by the normality of the numbers from which those outputs are built.

Combined Applications

It will be appreciated that the described embodiments may be combined with other PRNG systems and may operate in multiple functions in the processing of data, such as the de-biasing and conditioning of raw entropy output or in the operation of a hash function.

It will be appreciated that the described embodiments may be configured such that multiple separate embodiments with distinct initial parameters operate in parallel to improve the overall speed of operation depending on the specific application.

Certain steps in the processes or process flows described in this disclosure naturally precede others for the embodiments to function as described. However, embodiments are not limited to the order of the steps described if such order or sequence does not alter the functionality of the described embodiments. That is, it is recognized that some steps may performed before, after, or parallel (substantially simultaneously with) other steps without departing from the scope and spirit of the present disclosure. In some instances, certain steps may be omitted or not performed. Further, words such as "thereafter", "then", "next", etc. are not intended to limit the order of the steps. These words are simply used to guide the reader through the description of the exemplary method.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer implemented method comprising:
receiving data from a raw entropy source, the data comprising raw entropy to be transformed;
determining at least a first algebraic number from the data;
calculating at least one solution to one or more transcendental equations using the at least the first algebraic number as an input parameter value, wherein the one or more transcendental equations comprise a transcendental function that is capable of generating transcendental number outputs from algebraic number inputs;
determining one or more sequences of pseudo random numbers based on the at least one solution; and
determining an output based on the one or more sequences of pseudo random numbers.

2. The method of claim 1, wherein the output comprises a whitened transformation of the data or conditioned and de-biased data.

3. The method of claim 1, wherein the method is performed by a device comprising a True Random Number Generator (TRNG).

4. The method of claim 1, further comprising:
determining an interruption of the raw entropy output from the raw entropy source; and
responsive to determining the interruption, providing at least a portion of the one or more sequences of random numbers as an input parameter value for the one or more transcendental equations.

5. The method of claim 4, further comprising:
responsive to determining that the interruption has been rectified, determining the determining at least first algebraic number from the data received from the raw entropy source.

6. The method of claim 1, wherein generating one or more sequences of pseudo random numbers comprises generating one or more sequences of decimal numbers, binary numbers and numbers that are neither decimal numbers nor binary numbers.

7. The method of claim 1, comprising:
converting the one or more sequences of numbers into one or more sequences of integers; and
wherein determining an output based on the one or more sequences of pseudo random numbers comprises determining an output bit string based on the one or more sequences of integers.

8. The method of claim 1, wherein determining at least a first algebraic number from the data comprises converting the data to be processed into at least a first number.

9. The method of claim 8, wherein the data to be processed comprises a bit string and the method further comprising:
converting the bit string into a corresponding string of integers; and
converting the corresponding string of integers into the at least first number.

10. The method of claim 1, wherein the method is performed iteratively to generating pluralities of pseudo random numbers.

11. The method of claim 1, wherein generating the one or more sequences of pseudo random numbers comprises:
performing multiple iterations of the calculating of at least one solution to the one or more transcendental equations, wherein input parameter values for a next iteration are derived from solutions to a current iteration.

12. The method of claim 1, wherein the one or more sequences of pseudo random numbers comprises a first sequence of numbers and determining the output based on the one or more sequences of numbers comprises:
deriving the output as a subset of numbers of the first sequence of numbers generated.

13. The method of claim 12, wherein the first sequence of numbers is a first sequence of decimal numbers or binary numbers or numbers that are neither decimal numbers nor binary numbers and the subset of numbers comprises a subset of decimal numbers or binary numbers or numbers that are neither decimal numbers nor binary numbers.

14. The method of claim 1, wherein the one or more sequences of pseudo random numbers comprises a first sequence of numbers and a second sequence of numbers and determining the output based on the one or more sequences of numbers comprises:
deriving the output from a first subset of numbers selected from the first sequence of numbers and a second subset of numbers selected from the second sequence of numbers.

15. The method of claim 14,
wherein generating the first sequence comprises assigning a first number selected from the first sequence as a first input parameter value for the one or more transcendental equations and assigning a second number selected from the from the second sequence as a second input parameter value for the one or more transcendental equations; and
wherein generating the second sequence comprises assigning the second number as the first input parameter value for the one or more transcendental equations and assigning the first number as the second input parameter value for the one or more transcendental equations.

16. The method of claim 1, wherein the transcendental equation is:

$$e^{-\beta\lambda^2} = -\alpha\lambda \text{Erfc}(\lambda)$$

where $\text{Erfc}(\lambda) = 1 - (2/\sqrt{\pi})\sum_{n=0}^{\infty}[(-1)^n\lambda^{2n+1}]/[(2n+1)(n!)]$ where $e^{-\beta\lambda^2} = \sum_{n=0}^{\infty}(-\beta\lambda^2)^n/n!$ where $\lambda$ is the solution;
$\alpha$ is a first of the at least one algebraic input parameter value and $\beta$ is a second of the at least one algebraic input parameter value; and
wherein $\alpha$ and $\beta$ are real algebraic numbers.

17. The method of claim 1, wherein the transcendental equation is $e^{\beta_0}\alpha_1^{\beta_1} \ldots \alpha_n^{\beta_n}=\exp(\lambda)$ with the following analytic solution:

$\beta_0+\beta_1\cdot\ln(\alpha_1)\ldots\beta_n\cdot\ln(\alpha_n)=\lambda$ where $\lambda$ is the transcendental number, $\beta_0$ is a non-zero algebraic number, $\beta_1 \ldots \beta_n$ are algebraic numbers, $\alpha_1 \ldots \alpha_n$ are non-zero algebraic numbers, and n is an integer and is $\geq 1$; and
wherein the at least one algebraic input parameter value comprises $\beta_0, \beta_1 \ldots \beta_n$, and $\alpha_1 \ldots \alpha_n$.

18. The method of claim 1, wherein the transcendental equation is $e^{\beta_0}\alpha_1^{\beta_1}=\exp(\lambda)$ with the following analytic solution:

$\beta_0+\beta_1\cdot\ln(\alpha_1)=\lambda$ where $\lambda$ is the solution, $\beta_0$ is a non-zero algebraic number, $\beta_1$ is an algebraic number and $\alpha_1$ is a non-zero algebraic number; and
wherein the at least one algebraic input parameter value comprises $\beta_0, \beta_1$ and $\alpha_1$.

19. A non-transitory machine-readable medium storing instructions which, when executed by one or more processors, cause an electronic apparatus to perform operations comprising:
receiving data from a raw entropy source, the data comprising raw entropy to be transformed;
determining at least a first algebraic number from the data;
calculating at least one solution to one or more transcendental equations using the at least the first algebraic number as an input parameter value, wherein the one or more transcendental equations comprise a transcendental function that is capable of generating transcendental number outputs from algebraic number inputs;
determining one or more sequences of pseudo random numbers based on the at least one solution; and
determining an output based on the one or more sequences of pseudo random numbers.

20. A system comprising:
one or more processors; and
memory comprising a non-transitory machine-readable which, when executed by the one or more processors, causes the system to:
receive data from a raw entropy source, the data comprising raw entropy to be transformed;
determine at least a first algebraic number from the data;
calculate at least one solution to one or more transcendental equations using the at least the first algebraic number as an input parameter value, wherein the one or more transcendental equations comprise a transcendental function that is capable of generating transcendental number outputs from algebraic number inputs;
determine one or more sequences of pseudo random numbers based on the at least one solution; and
determine an output based on the one or more sequences of pseudo random numbers.

21. A True Random Number Generator (TRNG) comprising:
the system of claim 20; and
a raw entropy data source configured to provide raw entropy data to the system.

22. A computer implemented method comprising:
receiving data to be hashed;
determining at least a first algebraic number from the data;
calculating at least one solution to one or more transcendental equations using the at least the first algebraic number as an input parameter value, wherein the one or more transcendental equations comprise a transcendental function that is capable of generating transcendental number outputs from algebraic number inputs;
determining one or more sequences of pseudo random numbers based on the at least one solution; and
determining an output based on the one or more sequences of pseudo random numbers, wherein the output comprises a hash of the data.

23. The method of claim 22, wherein the method further comprises:
converting the determined output into hexadecimal text for use as the hash; and
outputting the hexadecimal text.

24. A non-transitory machine-readable medium storing instructions which, when executed by one or more processors, cause an electronic apparatus to perform operations comprising:
receiving data to be hashed;
determining at least a first algebraic number from the data;
calculating at least one solution to one or more transcendental equations using the at least the first algebraic number as an input parameter value, wherein the one or more transcendental equations comprise a transcendental function that is capable of generating transcendental number outputs from algebraic number inputs;
determining one or more sequences of pseudo random numbers based on the at least one solution; and
determining an output based on the one or more sequences of pseudo random numbers, wherein the output comprises a hash of the data.

25. A system comprising:
one or more processors; and
memory comprising a non-transitory machine-readable which, when executed by the one or more processors, causes the system to:
receive data to be hashed;
determine at least a first algebraic number from the data;
calculate at least one solution to one or more transcendental equations using the at least the first algebraic number as an input parameter value, wherein the one or more transcendental equations comprise a transcendental function that is capable of generating transcendental number outputs from algebraic number inputs;

determine one or more sequences of pseudo random numbers based on the at least one solution; and determine an output based on the one or more sequences of pseudo random numbers, wherein the output comprises a hash of the data.

26. A hashing system, comprising:

the system of claim 25; and a data source configured to provide data to be hashed to the system.

* * * * *